United States Patent
Kumar et al.

(10) Patent No.: US 11,671,849 B2
(45) Date of Patent: Jun. 6, 2023

(54) AUTONOMOUS BEAM SWITCHING

(71) Applicant: QUALCOMM Incorporated, San Diego, CA (US)

(72) Inventors: Vanitha Aravamudhan Kumar, San Diego, CA (US); Tom Chin, San Diego, CA (US); Thomas Christol, Boulder, CO (US); Uzma Khan Qazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/242,229

(22) Filed: Apr. 27, 2021

(65) Prior Publication Data
US 2021/0337398 A1  Oct. 28, 2021

Related U.S. Application Data

(60) Provisional application No. 63/016,884, filed on Apr. 28, 2020.

(51) Int. Cl.
| | |
|---|---|
| *H04W 56/00* | (2009.01) |
| *H04W 16/28* | (2009.01) |
| *H04L 1/20* | (2006.01) |
| *H04W 80/02* | (2009.01) |
| *H04B 7/06* | (2006.01) |
| *H04W 24/10* | (2009.01) |

(52) U.S. Cl.
CPC ......... *H04W 16/28* (2013.01); *H04B 7/0695* (2013.01); *H04L 1/203* (2013.01); *H04W 24/10* (2013.01); *H04W 56/001* (2013.01); *H04W 80/02* (2013.01)

(58) Field of Classification Search
CPC ... H04W 24/10; H04W 56/001; H04W 16/28; H04B 7/0695; H04L 1/203
See application file for complete search history.

(56) References Cited

U.S. PATENT DOCUMENTS

| | | | |
|---|---|---|---|
| 11,271,699 B1 * | 3/2022 | Eyuboglu | H04B 7/0691 |
| 2018/0159600 A1 * | 6/2018 | Kim | H04B 7/088 |

(Continued)

OTHER PUBLICATIONS

International Search Report and Written Opinion—PCT/US2021/029602—ISA/EPO—Aug. 2, 2021 16 pages.

*Primary Examiner* — Fahmida S Chowdhury
(74) *Attorney, Agent, or Firm* — Arun Swain; The Marbury Law Group, PLLC

(57) ABSTRACT

Various embodiments include methods for autonomous beam switching by a wireless device. A processor of the wireless device may measure signal parameters of signals received from a first synchronization signal block (SSB) beam of a base station monitored by the wireless device and other SSB beams of the base station, determine whether a difference in measured signal parameters of signals received from the first SSB beam and another SSB beam of the base station satisfies a signal quality difference threshold, and autonomously switching to the second SSB beam as the serving beam in response to determining that the difference in the measured signal parameters of signals received from the first SSB beam and a second SSB beam satisfies the signal quality difference threshold. The signal quality difference threshold may be listed in a table in memory or determined via machine learning.

30 Claims, 17 Drawing Sheets

(56) References Cited

U.S. PATENT DOCUMENTS

| | | | |
|---|---|---|---|
| 2018/0192438 A1* | 7/2018 | John Wilson | H04W 74/004 |
| 2019/0052380 A1* | 2/2019 | Cui | H04W 48/12 |
| 2019/0074887 A1* | 3/2019 | Yiu | H04B 17/327 |
| 2019/0081714 A1* | 3/2019 | Xiang | H04W 24/10 |
| 2019/0110300 A1* | 4/2019 | Chen | H04W 74/04 |
| 2019/0356444 A1* | 11/2019 | Noh | H04L 5/0051 |
| 2020/0351842 A1* | 11/2020 | Lin | H04W 72/23 |
| 2021/0058913 A1* | 2/2021 | Jang | H04W 24/08 |
| 2022/0271817 A1* | 8/2022 | Lee | H04B 17/382 |

* cited by examiner

AUTONOMOUS BEAM SWITCHING

RELATED APPLICATIONS

This application claims the benefit of priority to U.S. Provisional Application No. 63/016,884 entitled "Autonomous Beam Switching" filed Apr. 28, 2020, the entire contents of which are hereby incorporated by reference for all purposes.

BACKGROUND

Fifth Generation (5G) New Radio (NR) systems can provide high data rate communication services to mobile devices. However, the frequency bands used to provide NR services, such as millimeter wave frequencies, are susceptible to rapid channel variations and suffer from free-space pathloss and atmospheric absorption. To address these challenges, NR base stations and mobile devices may use highly directional antennas and beamforming to achieve sufficient link budget in wide area networks.

In 5G NR systems, a synchronization signal block (SSB) provides information, such as a primary synchronization signal (PSS), a secondary synchronization signal (SSS), and a physical broadcast channel demodulation reference signal (PBCH DM-RS), that enables a wireless device to synchronize with and receive certain signals of a beam from a base station. Conventionally, a wireless device may measure aspects of signals received from one of more beams of a base station and provide a report of such measurements to the base station. Based on the report from the wireless device, the base station instructs the wireless device about which beam to use via a media access control-control element (MAC-CE) message.

SUMMARY

Various aspects include systems and methods performed by a processor of a wireless device for autonomous beam switching. Various aspects may include measuring signal parameters of signals received from a first synchronization signal block (SSB) beam as a serving beam of a base station monitored by the wireless device and one or more other SSB beams of the base station, determining whether a difference in the measured signal parameters of signals received from the first SSB beam and a second SSB beam of the base station satisfies a signal quality difference threshold; and autonomously switching to monitoring the second SSB beam of the base station as the serving beam in response to determining that the difference in the measured signal parameters of signals received from the first SSB beam and the second SSB beam of the base station satisfies a signal quality difference threshold.

In some aspects, determining whether a difference in the measured signal parameters of signals received from the first SSB beam and a second SSB beam of the base station satisfies a signal quality difference threshold may include determining whether the difference in the measured signal parameters of signals received from the first SSB beam and the second SSB beam of the base station satisfies the signal quality difference threshold before receiving a MAC Control Element (MAC-CE) instructing the wireless device to switch the serving beam or without receiving the MAC-CE. In some aspects, autonomously switching to monitoring the second SSB beam of the base station as the serving beam may include switching to monitoring the second SSB beam of the base station before receiving the MAC-CE or without receiving the MAC-CE. Some aspects may include receiving data in signals received from a first data beam that is quasi-co-located (QCL) with the first SSB beam prior to autonomously switching to monitoring the second SSB beam, and receiving data in signals received from a second data beam that is quasi-co-located (QCL) with the second SSB beam after autonomously switching to monitoring the second SSB beam.

Some aspects may include obtaining the signal quality difference threshold from a data table stored in memory using a location of the wireless device as a look up index. Some aspects may include using a trained neural network to determine the signal quality difference threshold. In some aspects, using a trained neural network to determine the signal quality difference threshold may include dynamically applying a plurality of parameters including a location of the wireless device to the trained neural network and receiving the signal quality difference threshold as an output.

Some aspects may include refining the trained neural network by receiving an instruction from a second base station to switch from monitoring one SSB beam of the second base station to another SSB beam of the second base station, determining a change in link quality (e.g., data throughput) resulting from the switch from monitoring one SSB beam of the second base station to another SSB beam of the second base station, and correlating the change in link quality (e.g., data throughput) resulting from the switch, a location of the wireless device at a time of the switch, and measured signal parameters of signals received from a plurality of SSB beams of the base station at the time of the switch to refine the trained neural network.

Some aspects may include training the neural network by determining a link quality (e.g., data throughput) of signals received from each SSB beam of the base station at a location of the wireless device, and training the neural network using the determined link quality of signals received from each SSB beam of the base station at the location of the wireless device. Some aspects may include repeatedly moving the wireless device to a new location, determining a link quality (e.g., data throughput) of signals received from each SSB beam of the base station at each new location, and training the neural network using the determined link quality of signals received from each SSB beam of the base station at each new location. Some aspects may include measuring one or more parameters in addition to a location of the wireless device at each new location. In such aspects, training the neural network using the determined link quality of signals received from each SSB beam of the base station at each new location may include training the neural network using the determined link quality of signals received from each SSB beam of the base station and the measured one or more parameters at each new location.

In some aspects, measuring one or more parameters may include determining or measuring one or more of a serving SSB identifier, a cell identifier of a serving cell, a signal strength of signals received from each SSB beam, a signal quality of signals received from each SSB beam, a difference in reference signal received power (RSRP) of signals received from each SSB beam, a difference in reference signal received quality (RSRQ) of signals received from each SSB beam, a difference in signal-to-noise ratio (SNR) of signals received from each SSB beam, an initial block error rate (iBLER) of signals received from each SSB beam, a residual block error rate (rBLER) of signals received from each SSB beam, a mobility of the wireless device at a time of measurement, an orientation of the wireless device at the time of measurement, a number of detectible SSB beams, a number of configured SSB beams, a beam status report configured by the base station, a number of SSB status reports sent by the wireless device to the base station, a number and frequency of autonomous SSB switches performed by the wireless device, a number and frequency of SSB beam switches performed in response to an instruction from the base station, an average duration between transmission of a beam status report and receipt of a beam switch instruction from the base station, beam failure detection and recovery statistics, frequency and time tracking loop statistics, a mobile network code (MNC) or mobile country code (MCC) of a communication network associated with the base station, or an infrastructure vendor associated with the base station.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above.

Further aspects include a system on chip for use in a wireless device that includes a processor configured to perform one or more operations of any of the methods summarized above.

Further aspects include systems and methods performed by a processor of a computing device for training a neural network for use by a wireless device in autonomous beam switching. Various aspects may include determining a data throughput or other measure of link quality of signals received from each of a plurality of synchronization signal block (SSB) beams of a base station at a location of the computing device, training the neural network using the determined throughput or other measure of link quality of signals received from each SSB beam of the base station at the location of the wireless device, and providing the trained neural network to the wireless device in a configuration that enables the wireless device to determine a signal quality difference threshold useful for determining whether to autonomously switch monitored SSB beams of a base station.

Some aspects may include repeatedly moving the computing device to a new location, determining a data throughput or other measure of link quality of signals received from each SSB beam of the base station at each new location, and training the neural network using the determined throughput each SSB beam of the base station at each new location. Some aspects may include measuring one or more parameters in addition to the location of the wireless device at each new location. In such aspects, training the neural network using the determined throughput or other measure of link quality of signals received from each SSB beam of the base station at each new location may include training the neural network using the determined throughput or other measure of link quality of signals received from each SSB beam of the base station and the measured one or more parameters at each new location.

In some aspects, measuring a plurality of parameters may include determining or measuring one or more of a serving SSB identifier, a cell identifier of a serving cell, a signal strength of signals received from each SSB beam, a signal quality of signals received from each SSB beam, a difference in reference signal received power (RSRP) of signals received from each SSB beam, a difference in reference signal received quality (RSRQ) of signals received from each SSB beam, a difference in signal-to-noise ratio (SNR) of signals received from each SSB beam, an initial block error rate (iBLER) of signals received from each SSB beam, a residual block error rate (rBLER) of signals received from each SSB beam, a mobility of the computing device at a time of measurement, an orientation of the computing device at the time of measurement, a number of detectible SSB beams, a number of configured SSB beams, a beam status report configured by the base station, an average duration between transmission of a beam status report and receipt of a beam switch instruction from the base station, beam failure detection and recovery statistics, frequency and time tracking loop statistics, a mobile network code (MNC) or mobile country code (MCC) of a communication network associated with the base station, or an infrastructure vendor associated with the base station.

Further aspects may include a computing device having a processor configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include a computing device having means for performing functions of any of the methods summarized above.

Further aspects include a system on chip for use in a computing device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
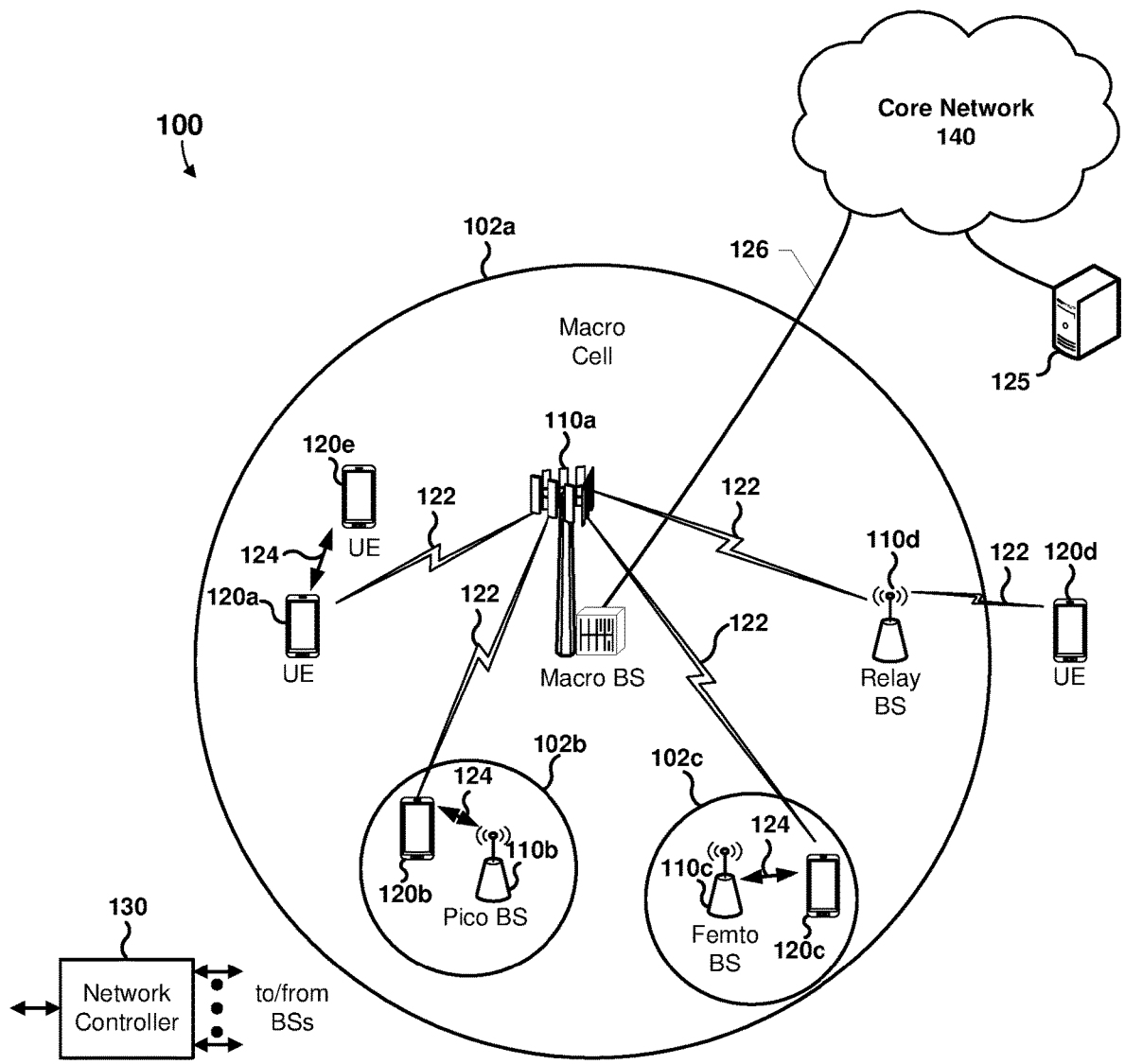
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for autonomous SSB beam switching by a wireless device. Various embodiments enable a wireless device to determine when to autonomously switch to another SSB beam of a base station (or other network element) based on SSB beam signal parameters determined by the wireless device. A processor of the wireless device may measure signal parameters of signals received from the SSB beams of the base station and determine whether a difference in the measured signal parameters of signals received from the first SSB beam and a second SSB beam differ by at least a signal quality difference threshold. If that condition is met, the wireless device may autonomously switch to monitoring the second SSB beam of the base station. The appropriate signal quality difference threshold to use in making this determination may depend on location and/or wireless network. Therefore, the signal quality difference threshold used by a wireless device may be determined dynamically based on one or more parameters including device location. In some embodiments, the signal quality difference threshold may be determined using a table lookup process or determined using a trained neural network that was generated using machine learning techniques and loaded on the wireless device.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein. "beam" refers to a signal formed at a transmitting device through the use of a beamforming or beam steering technique applied via a combination of physical equipment and signal processing variously referred to as a beamforming function, a mapping function, or a spatial filter. Beam reception by a receiving device may involve configuring physical equipment and signal processing of the receiving device to receive signals transmitted in a beam by the transmitting device. In some situations, beam reception by a receiving device also may involve configuring physical equipment and signal processing of the receiving device via a beamforming function, a mapping function, or a spatial filter so as to preferentially receive signals (e.g., with enhanced gain) from a particular direction (e.g., in a direction aligned with a transmitting device).

As used herein. "monitoring an SSB beam" refers to a wireless device receiving signals from the monitored SSB beam as a source of information that enables the wireless device to synchronize with and receive certain signals transmitted in a beam from a base station to facilitate communications with the base station (e.g., as a serving beam). Such information may include the primary synchronization signal (PSS), secondary synchronization signal (SSS), and physical broadcast channel demodulation reference signal (PBCH DM-RS).

While a wireless device may perform measurement(s) of other SSB beams to determine one or more parameters of the other SSB beams, "monitoring" an SSB beam refers to performing operations that are distinct from measuring parameter(s) of an SSB beam.

As used herein, "serving beam" refers to a beam for radio frequency signals that provides data and/or control information to a wireless device, which may include the primary synchronization signal (PSS), secondary synchronization signal (SSS), and physical broadcast channel demodulation reference signal (PBCH DM-RS).

Conventionally, a base station instructs a wireless device about which beam to use via a media access control-control element (MAC-CE) message. However, this functionality relies on the signaling from the base station. If the base station fails to send the beam instruction, or the wireless device fails to receive the instruction, the wireless device may continue to receive signals from an SSB beam that provides inferior reception by the wireless device compared to another SSB beam transmitted by the base station, and as a result suffer from degraded signal quality and/or data throughput compared to what would be available receiving signals from a superior SSB beam of the base station.

Various embodiments include methods and wireless devices configured to perform the methods for autonomous beam switching. In various embodiments, the wireless device may perform autonomous beam switching in the absence of a beam switching instruction or beam switching information from a base station (e.g., via a MAC-CE message). In various embodiments, a wireless device may measure signal parameters of signals received from multiple SSB beams of the base station on which the wireless device is camped, including signals received from a first SSB beam of the base station that the wireless device is currently monitoring as a serving beam. The wireless device may determine whether a difference in the measured signal parameters of signals received from the first SSB beam and a second SSB beam of the base station satisfies a signal quality difference threshold. In response to determining that the difference in the measured signal parameters of signals received from the first SSB beam and a second SSB beam of the base station satisfies the signal quality difference threshold, the wireless device may autonomously switch to monitoring the second SSB beam of the base station as the serving beam. In some embodiments, the wireless device may receive data in signals received from a first data beam that is quasi-co-located (QCL) with the first SSB beam, and after autonomously switching to monitoring the second SSB beam, the wireless device may receive data in signals received from a second data beam that is QCL with the second SSB beam.

The signal quality difference threshold is a value correlated to SSB beam and network conditions that indicates that the wireless device may benefit (e.g., achieving greater data throughput) by autonomously switching to the SSB beam that offers better signal reception. The signal quality difference threshold may be determined dynamically based on the location of the wireless device, as well as other factors, because the benefit in terms of data throughput from autonomously switching SSB beams varies from location to location and network to network.

In some embodiments, the wireless device may obtain the signal quality difference threshold from a data table stored in memory using a location of the wireless device as a look up index. In some embodiments, the wireless device may use a trained neural network to determine dynamically the signal quality difference threshold. In such embodiments, the wireless device may dynamically apply a plurality of parameters including a location of the wireless device to the trained neural network. In such embodiments, the wireless device may receive the signal quality difference threshold as an output from the trained neural network.

In some embodiments that use a trained neural network, the wireless device may refine or "tune" the neural network using additional information received during operations. For example, the wireless device may refine the trained neural network by receiving an instruction from the base station (or a second base station) to switch from monitoring one SSB beam to another SSB beam. The wireless device may determine a change in link quality (e.g., data throughput) resulting from the switch from monitoring one SSB beam to another SSB beam, and correlate the change in link quality (e.g., data throughput) resulting from the switch, the location of the wireless device at the time of the switch, and the measured signal parameters of signals received from the plurality of SSB beams of the base station at the time of the switch to refine the trained neural network.

In some embodiments, the training process of the neural network may include determining a link quality (e.g., data throughput) of signals received from each SSB beam of the base station at a location of the wireless device (e.g., by sequentially selecting each or some of the SSB beams and measuring the resulting data throughput or other link quality parameter), and training the neural network using the determined throughput or other link quality parameter of signals received from each SSB beam of the base station at the location of the wireless device. Such embodiments may further include repeatedly moving the wireless device to a new location, determining a data throughput or other link quality parameter of signals received from each or some of the SSB beams of the base station at each new location, and training the neural network using the determined throughput or other link quality parameter of signals received from each SSB beam of the base station at each new location. Such embodiments may further include measuring one or more parameters in addition to the wireless device's location at each new location, and training the neural network using the determined throughput of signals received from each SSB beam of the base station and the measured one or more parameters at each new location.

In various embodiments, the measured parameters applied to the trained neural network and/or training the neural network may include one or more of a serving SSB identifier, a cell identifier of a serving cell, a signal strength of signals received from each SSB beam, a signal quality of signals received from each SSB beam, a difference in reference signal received power (RSRP) of signals received from each SSB beam, a difference in reference signal received quality (RSRQ) of signals received from each SSB beam, a difference in signal-to-noise ratio (SNR) of signals received from each SSB beam, an initial block error rate (iBLER) of signals received from each SSB beam, a residual block error rate (rBLER) of signals received from each SSB beam, a mobility of the wireless device at a time of measurement, an orientation of the wireless device at the time of measurement, a number of detectible SSB beams, a number of configured SSB beams, a beam status report configured by the base station, a number of SSB status reports sent by the wireless device to the base station, a number and frequency of autonomous SSB switches performed by the wireless device, a number and frequency of SSB beam switches performed in response to an instruction from the base station, an average duration between transmission of a beam status report and receipt of a beam switch instruction from the base station, beam failure detection and recovery statistics, frequency and time tracking loop statistics, a mobile network code (MNC) or mobile country code (MCC) of a communication network associated with the base station, or an infrastructure vendor associated with the base station.

Further embodiments include methods and computing devices configured to perform the methods for training a neural network for use by a wireless device in autonomous beam switching. In such embodiments, the computing device may access base stations at a given location, determine the data throughput or other link quality parameter of signals received from each of a plurality of SSB beams of signals received from each base station accessible at the location, and train the neural network using the determined throughput or other link quality parameter of signals received from each of the SSB beams of signals received from each of the base stations at the location of the wireless device using the location and/or other measured parameters as parameters correlated to SSB beam throughput or other link quality parameter. In particular, the computing device may determine differences in signal quality of signals received from the various SSB beams and determine the resulting change in data throughput or other link quality parameter achieved by changing from one SSB beam to another, and use the results to train the neural network. Training the neural network may include repeatedly moving the wireless device to a new location, determining a data throughput or other link quality parameter of signals received from each SSB beam of the base station at each new location, and training the neural network using the determined throughput or other link quality parameter of signals received from each SSB beam of the base station at each new location. The computing device may provide the trained neural network to the wireless device in a configuration that enables the wireless device to determine a signal quality difference threshold useful for determining whether to autonomously switch monitored SSB beams of a base station.

In some embodiments, training the neural network by the computing device may include measuring one or more parameters in addition to the location of the wireless device at each new location, and training the neural network using the determined throughput or other link quality parameter of signals received from each of the SSB beams of signals received from each of the base stations and the measured one or more parameters at each new location. In various embodiments, the measured parameters may include one or more of a serving SSB identifier, a cell identifier of a serving cell, a signal strength of signals received from each SSB beam, a signal quality of signals received from each SSB beam, a difference in reference signal received power (RSRP) of signals received from each SSB beam, a difference in reference signal received quality (RSRQ) of signals received from each SSB beam, a difference in signal-to-noise ratio (SNR) of signals received from each SSB beam, an initial block error rate (iBLER) of signals received from each SSB beam, a residual block error rate (rBLER) of signals received from each SSB beam, a mobility of the wireless device at a time of measurement, an orientation of the wireless device at the time of measurement, a number of detectible SSB beams, a number of configured SSB beams, a beam status report configured by the base station, a number of SSB status reports sent by the wireless device to the base station, a number and frequency of autonomous SSB switches performed by the wireless device, a number and frequency of SSB beam switches performed in response to an instruction from the base station, an average duration between transmission of a beam status report and receipt of a beam switch instruction from the base station, beam failure detection and recovery statistics, frequency and time tracking loop statistics, a mobile network code (MNC) or mobile country code (MCC) of a communication network associated with the base station, or an infrastructure vendor associated with the base station.

Various embodiments improve the operation and performance of wireless devices by enabling the devices to autonomously take advantage of SSB beams that will provide improved data throughput performance or other link quality performance in situations in which the wireless network fails to instruct the wireless device to shift to a better SSB beam.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of wireless devices (illustrated as wireless device 120a-120e in FIG. 1). The communications system 100 may also include one or more network computing devices 125 that may communicate with the wireless devices 120a-120e. In some embodiments, the wireless device 120a-120e may send data to the network computing device(s) 125 for processing as part of a computing task.

The communications system 100 may also include a number of base stations (illustrated as the BS 110a, the BS 110b, the BS 110c, and the BS 110d) and other network entities. A base station is an entity that communicates with wireless devices, and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with a service subscription. A pico cell may cover a relatively small geographic area and may allow unrestricted access by wireless devices with a service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120*a*-120*e* may communicate with the base station 110*a*-110*d* over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110*d*). A relay station is an entity that can receive a transmission of data from an upstream station (for example, a base station or a wireless device) and transmit the data to a downstream station (for example, a wireless device or a base station). A relay station also may be a wireless device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. A wireless device 120*a*-120*e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases. NR or 5G RAT networks may be deployed.

Figure 2:
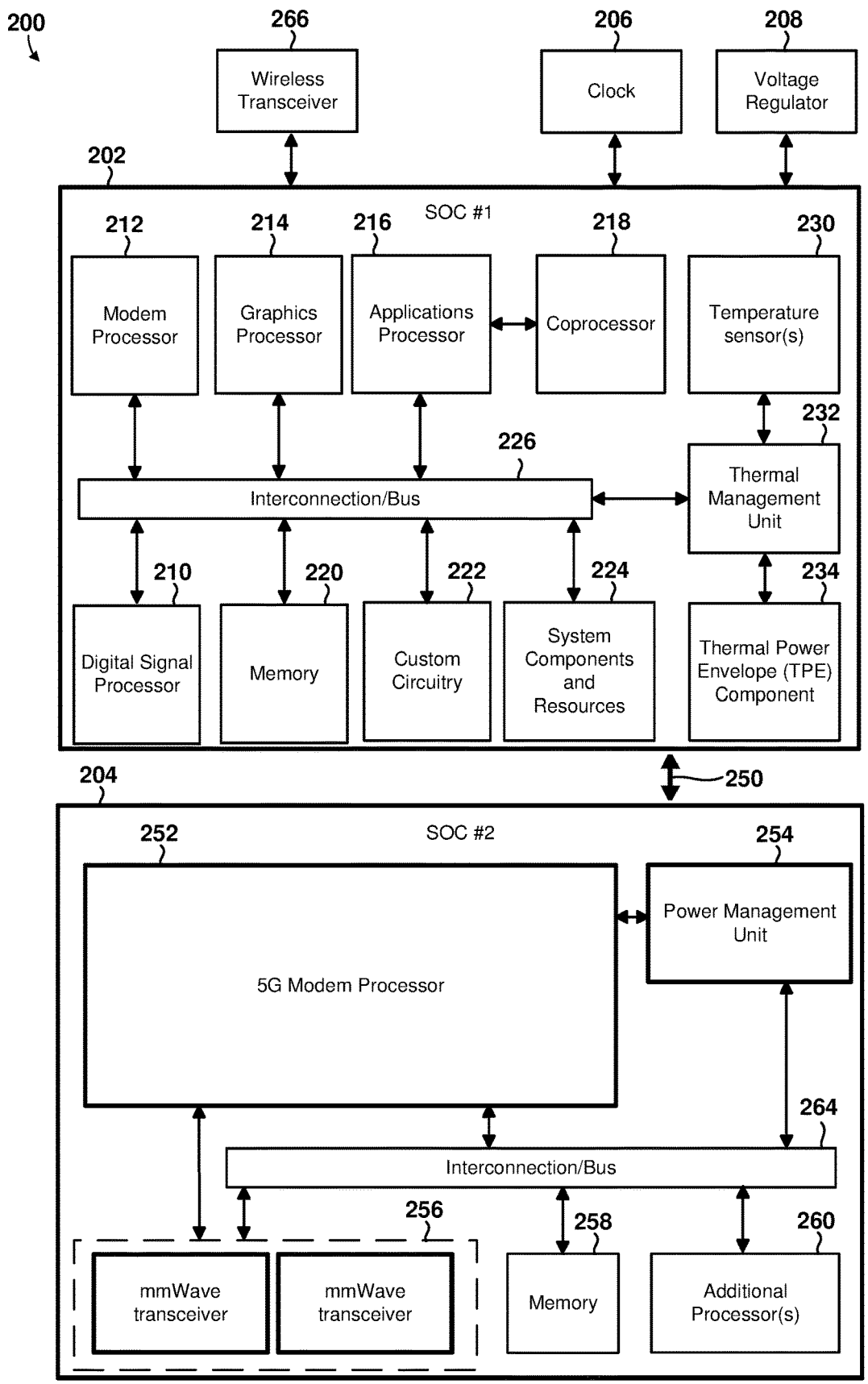
FIG. 2 is a component block diagram illustrating an example computing and wireless modem system suitable for implementing any of the various embodiments.

In some embodiments, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
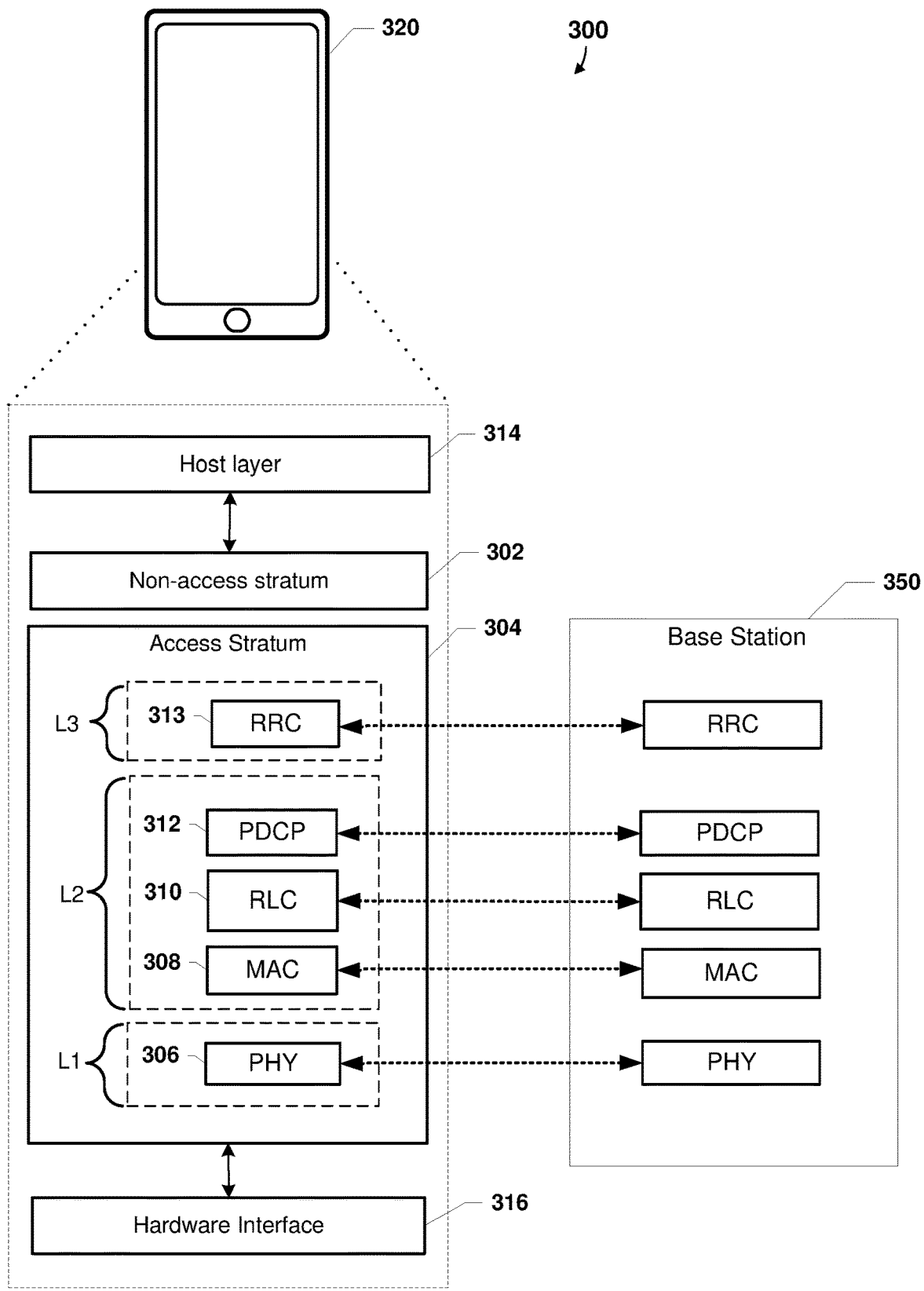
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
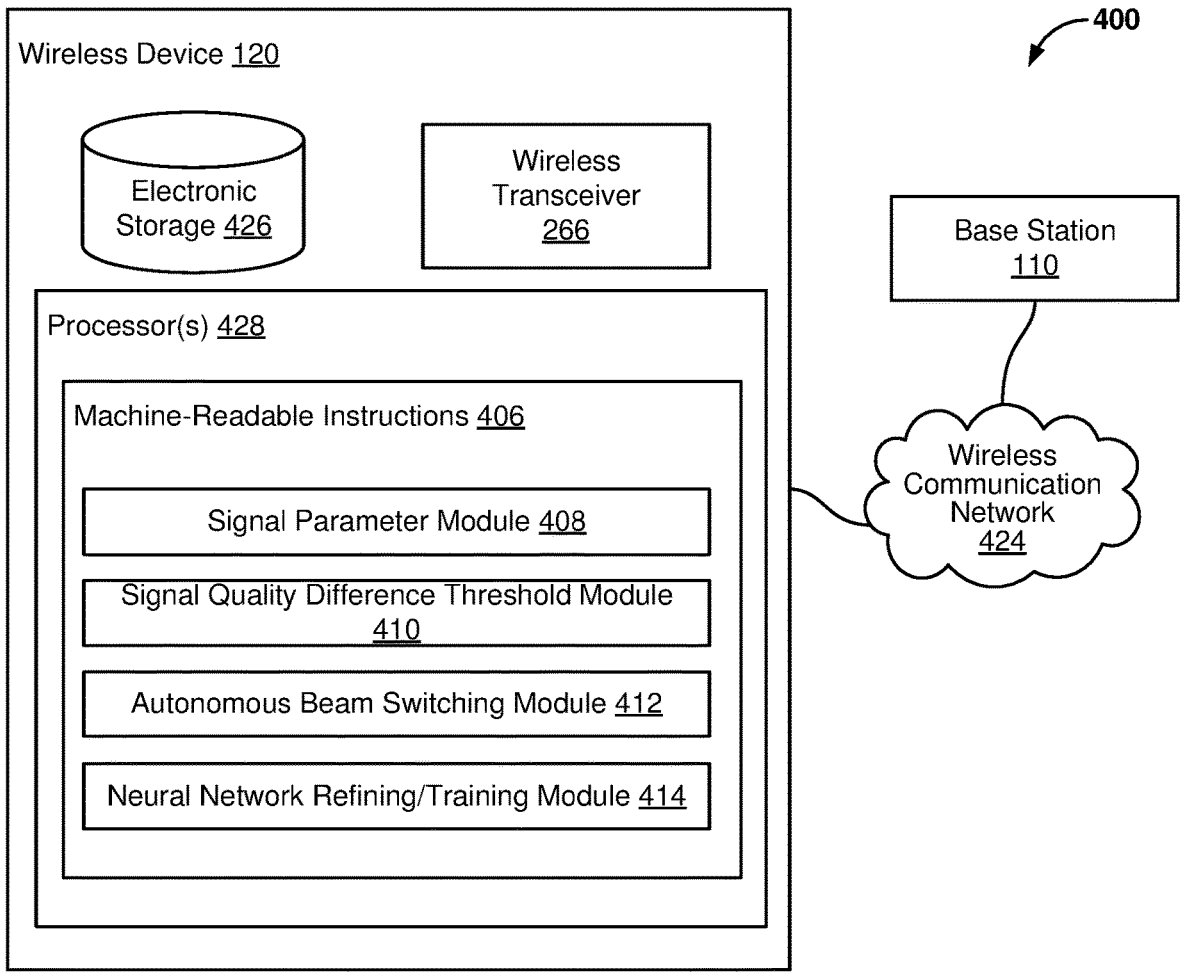
FIGS. 4A and 4B are component block diagrams illustrating systems configured for managing information transmission for wireless communications performed by a processor of a base station in accordance with various embodiments.

FIG. 4A is a component block diagram illustrating a system 400 configured for processing data using computing resources of a remote network computing device in accordance with various embodiments. With reference to FIGS. 1-4A, the system 400 may include a wireless device 120 and a base station 110. The wireless device 120 and the base station 110 may communicate over a wireless communication network 424 (aspects of which are illustrated in FIG. 1).

Referring to FIG. 4A, the wireless device 120 may include one or more processors 428 coupled to electronic storage 426 and a wireless transceiver (e.g., 266). The wireless transceiver 266 may be configured to receive messages to be sent in uplink transmissions from the processor(s) 428, and to transmit such messages via an antenna (not shown) to a wireless communication network 424 for relay to a base station 110. Similarly, the wireless transceiver 266 may be configured to receive messages from the base station 110 in downlink transmissions from the wireless communication network 424 and pass the messages (e.g., via a modem (e.g., 252) that demodulates the messages) to the one or more processors 428.

The processor(s) 428 may be configured by machine-readable instructions 406. Machine-readable instructions 406 may include one or more instruction modules. The instruction modules may include computer program modules. The instruction modules may include one or more of a signal parameter module 408, a signal quality difference threshold module 410, an autonomous beam switching module 412, a neural network refining/training module 414, or other instruction modules.

The signal parameter module 408 may be configured to measure signal parameters of signals received from a first synchronization signal block (SSB) beam of a base station monitored by the wireless device and one or more other SSB beams of the base station.

The signal quality difference threshold module 410 may be configured to determine whether a difference in the measured signal parameters of signals received from the first SSB beam and a second SSB beam of the base station satisfies a signal quality difference threshold. The signal quality difference threshold module 410 may be configured to obtain the signal quality difference threshold from a data table stored in memory using a location of the wireless device as a look up index. The signal quality difference threshold module 410 may be configured to use a trained neural network to determine dynamically the signal quality difference threshold. The signal quality difference threshold module 410 may be configured to dynamically apply a plurality of parameters including a location of the wireless device to the trained neural network and receiving the signal quality difference threshold as an output.

The autonomous beam switching module 412 may be configured to autonomously switch to monitoring the second SSB beam of the base station in response to determining that the difference in the measured signal parameters of signals received from the first SSB beam and a second SSB beam of the base station satisfies a signal quality difference threshold.

The neural network refining/training module 414 may be configured to refine the trained neural network by receiving an instruction from a second base station to switch from monitoring one SSB beam of the second base station to another SSB beam of the second base station, determining a change in data throughput or other link quality parameter resulting from the switch from monitoring one SSB beam of the second base station to another SSB beam of the second base station, and correlating the change in data throughput or other link quality parameter resulting from the switch, a location of the wireless device at the time of the switch, and the measured signal parameters of signals received from the plurality of SSB beams of the base station at the time of the switch to refine the trained neural network. The neural network refining/training module 414 may be configured to train the neural network by determining a data throughput or other link quality parameter of signals received from each SSB beam of the base station at a location of the wireless device, and training the neural network using the determined throughput or other link quality parameter of signals received from each SSB beam of the base station at the location of the wireless device.

The neural network refining/training module 414 may be configured to repeatedly move the wireless device to a new location, determine a data throughput or other link quality parameter of signals received from each SSB beam of the base station at each new location, and train the neural network using the determined throughput or other link quality parameter of signals received from each SSB beam of the base station at each new location. The neural network refining/training module 414 may be configured to measure one or more parameters in addition to the wireless device's location at each new location. The neural network refining/training module 414 may be configured to train the neural network using the determined throughput or other link quality parameter of signals received from each SSB beam of the base station and the measured one or more parameters at each new location.

The electronic storage 426 may include non-transitory storage media that electronically stores information. The electronic storage media of electronic storage 426 may include one or both of system storage that is provided integrally (i.e., substantially non-removable) with the wireless device 120 and/or removable storage such as a SIM card that is removably connectable to the wireless device 120. Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may store software algorithms, information determined by the processor(s) 428, information received from the computing device 110, or other information that enables the wireless device 120 to function as described herein.

The processor(s) 428 may be configured to provide information processing capabilities in the wireless device 120. As such, the processor(s) 428 may include one or more of a digital processor, an analog processor, a digital circuit designed to process information, an analog circuit designed to process information, a state machine, and/or other mechanisms for electronically processing information. Although the processor(s) 428 is illustrated as single entities, this is for illustrative purposes only, and the processor(s) 428 may include a plurality of processing units and/or processor cores. The processor(s) 428 may be configured to execute modules 408-414 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 is for illustrative purposes, and is not intended to be limiting, as any of modules 408-414 may provide more or less functionality than is described. For example, one or more of the modules 408-414 may be eliminated, and some or all of its functionality may be provided by other modules 408-414 and modules 436-440. As another example, the processor(s) 428 may be configured to execute one or more additional modules that may perform some or all of the functionality attributed below to one of the modules 408-414.

Figure 4B:
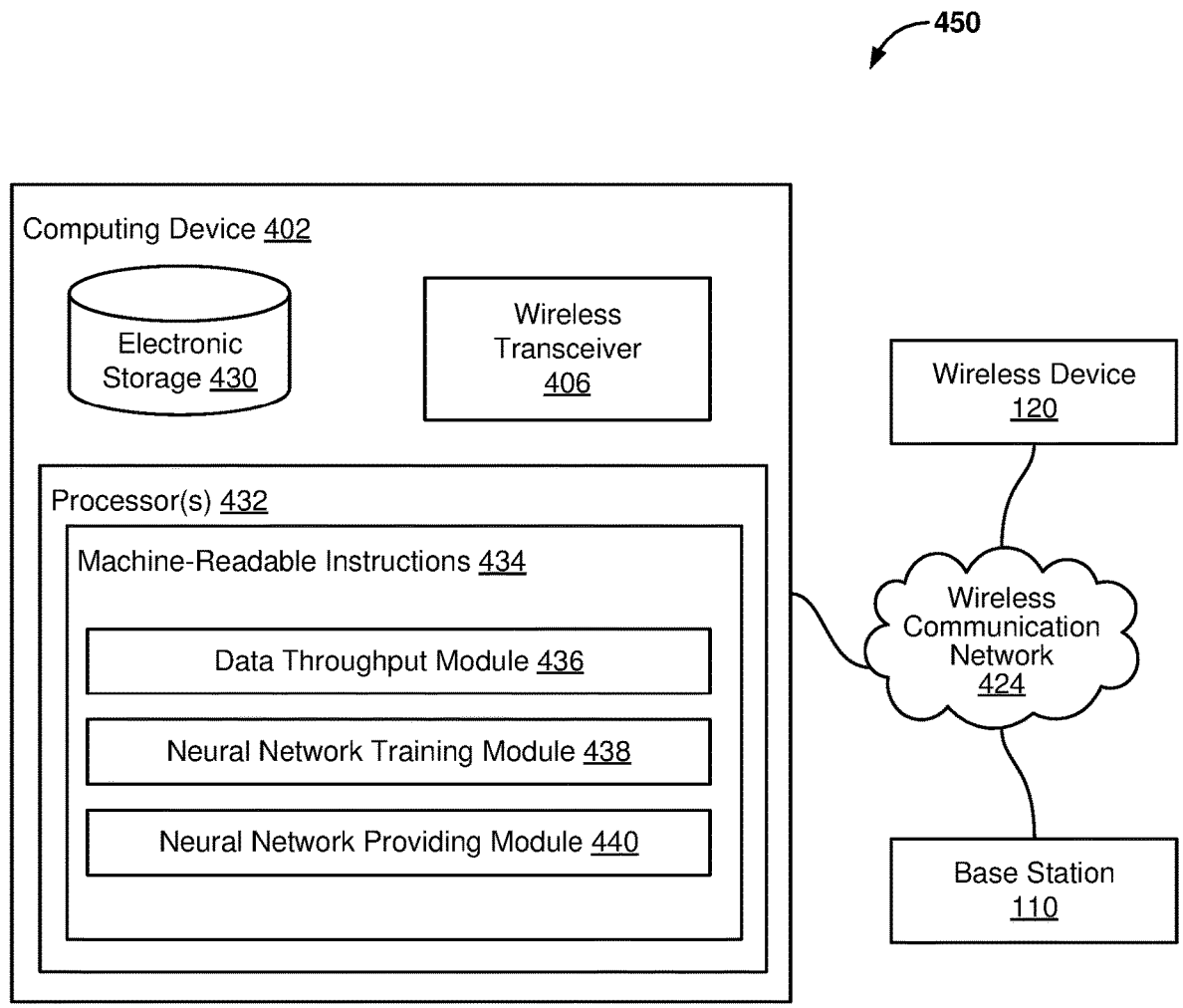

FIG. 4B is a component block diagram illustrating a system 450 for training a neural network to support autonomous SSB beam shifting by wireless devices in accordance with various embodiments. With reference to FIGS. 1-4B, the system 400 may include a wireless computing device 402 configured to communicate with wireless devices 120 and network base stations 110. The wireless computing device 402 may include one or more processors 432 coupled to electronic storage 430 and a wireless transceiver 406. The wireless transceiver 406 may be configured to access SSB beams of bases stations 110 within a wireless communication network 424 and measure various parameters, including characteristics (e.g., QoS) of signals received from SSB beam, data throughput or other link quality parameter of signals received from one or more SSB beams, location and other parameters as described herein.

The processor(s) 432 may be configured by machine-readable instructions 434. Machine-readable instructions 434 may include one or more instruction modules. The instruction modules may include computer program modules. The instruction modules may include one or more of a link quality module 436, a neural network training module 438, a neural network providing module 440, or other instruction modules.

The link quality module 436 may be configured to determine a data throughput of signals received from each of a plurality of SSB beams of any base stations 110 accessible at a location of the computing device 402. The link quality module 436 may further be configured to measure other parameters or characteristics of signals received from each SSB beam, such as an initial BLER, a residual BLER, etc.

The neural network training module 438 may be configured to train the neural network using the determined link quality (e.g., data throughput) of signals received from each of the SSB beams of signals received from each base station 110 at each location, as well as other parameters or characteristics of signals received from each SSB beam. The computing device may be moved to different locations and the neural network training module 438 may be configured to repeat the operations of determining link quality (e.g., data throughput) and other characteristics of signals received from each of SSB beam of signals received from each accessible base station 110 at each new location, and use the gathered information to train the neural network.

The neural network providing module 438 may be configured to provide the trained neural network to wireless devices in a configuration that enables the wireless devices to determine a signal quality difference threshold useful for determining whether to autonomously switch monitored SSB beams of a base station 110.

The electronic storage 430 may include non-transitory storage media that electronically stores information. The electronic storage media of electronic storage 430 may include one or both of system storage that is provided integrally (i.e., substantially non-removable) with the computing device 402 and/or removable storage that is removably connectable to the computing device 402 via, for example, a port (e.g., a universal serial bus (USB) port, a firewire port, etc.) or a drive (e.g., a disk drive, etc.). Electronic storage 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 430 may include one or more virtual storage resources (e.g., cloud storage, a virtual private network, and/or other virtual storage resources). Electronic storage 430 may store software algorithms, information determined by processor(s) 432, information received by the computing device 402, or other information that enables the computing device 402 to function as described herein.

The processor(s) 432 may be configured to provide information processing capabilities in the computing device 402. As such, the processor(s) 432 may include one or more of a digital processor, an analog processor, a digital circuit designed to process information, an analog circuit designed to process information, a state machine, and/or other mechanisms for electronically processing information. Although the processor(s) 432 are illustrated as single entities, this is for illustrative purposes only. In some embodiments, the processor(s) 432 may include a plurality of processing units and/or processor cores. The processing units may be physically located within the same device, or processor(s) 432 may represent processing functionality of a plurality of devices operating in coordination. The processor(s) 432 may be configured to execute modules 436-440 and/or other modules by software; hardware; firmware; some combination of software, hardware, and/or firmware; and/or other mechanisms for configuring processing capabilities on processor(s) 432.

The description of the functionality provided by the different modules 436-440 is for illustrative purposes, and is not intended to be limiting, as any of modules 436-440 may provide more or less functionality than is described. For example, one or more of the modules 436-440 may be eliminated, and some or all of its functionality may be provided by other modules 436-440. As another example, the processor(s) 432 may be configured to execute one or more additional modules that may perform some or all of the functionality attributed to one of the modules 436-440.

Figure 5A:
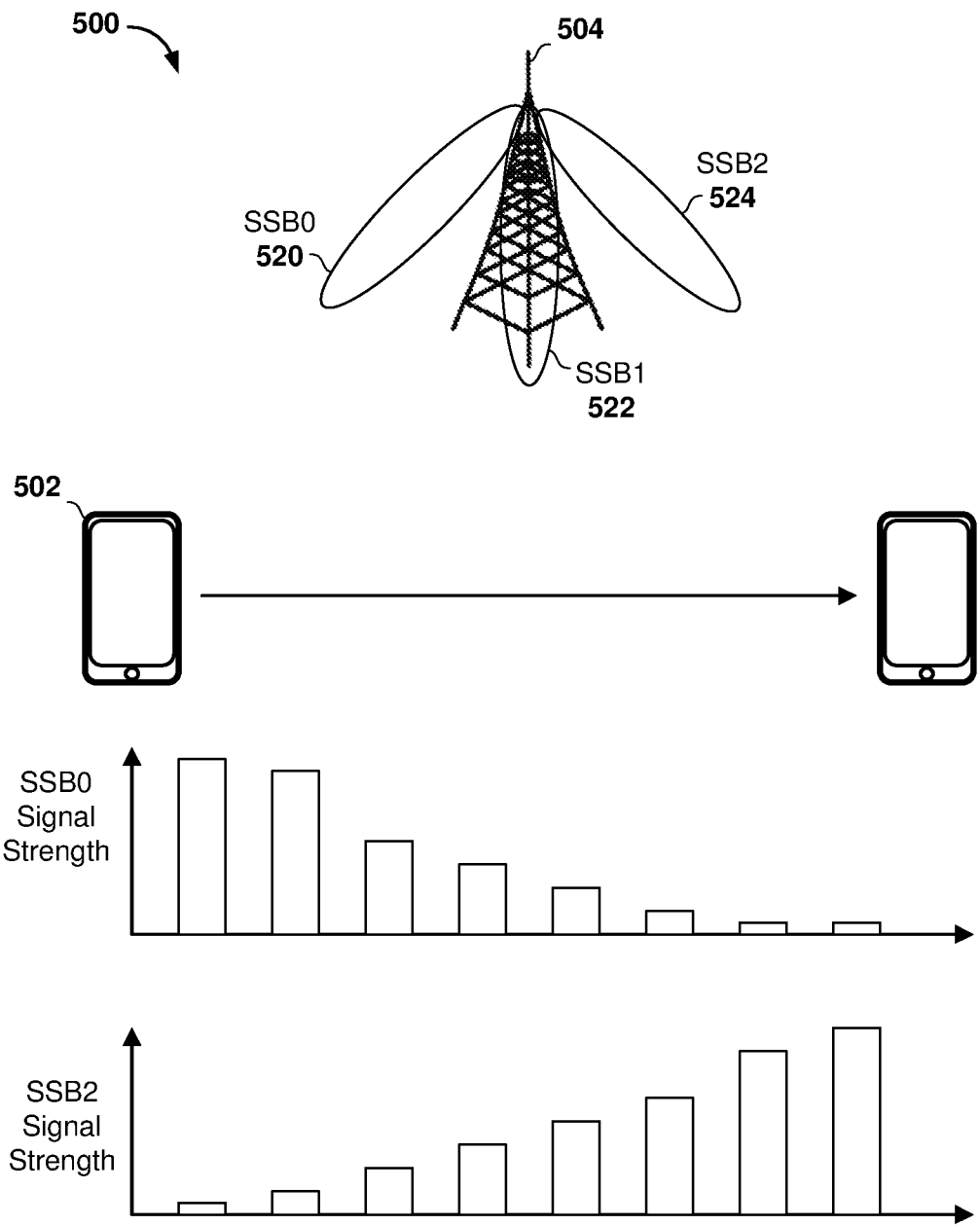
FIG. 5A is a block diagram illustrating received SSB signal strengths received by a wireless device from a base station according to various embodiments.

FIG. 5A is a block diagram illustrating received SSB signal strengths 500 received by a wireless device 502 (e.g., 120a-120e, 200, 320, 120) from a base station 504 (e.g., 110a-110d, 402) according to various embodiments. With reference to FIGS. 1-5A, the base station 504 may transmit a plurality of SSB beams (e.g., SSB0 520, SSB1 522, and SSB2 524) in different directions. The wireless device 502 may receive signals transmitted in one or more of the SSB beams 520-524 and may measure one or more parameters of the signals received from the one or more SSB beams. The wireless device 502 may provide information determined by the wireless device 502 to the base station 504 in a report or message, such as a channel state indicator (CSI) report. The parameters of signals received from each SSB beam measured by the wireless device 502 may vary depending on a variety of conditions. As the wireless device 502 moves relative to the base station 504, the wireless device may receive signals received from different SSB beams more strongly or clearly, which will be reflected in the various parameter measurement performed by the wireless device. For example, as the wireless device 502 moves relative to the base station 504, the wireless device may measure a decline in signal strength in signals received from SSB0 520, and may measure an increase in signal strength in signals received from SSB2 524. Initially, reception of signals received from SSB0 520 is superior to reception of signals received from SSB2 522, but as the wireless device 502 moves relative to the base station 504, reception of signals received from SSB2 524 become superior to reception of signals received from SSB0 520.

Initially, the base station 504 may instruct the wireless device 502 to monitor SSB0 in a beam instruction (for example, via a MAC-CE message). As the wireless device 502 moves and reception of signals received from SSB2 524 becomes superior to reception of signals received from SSB0 520, the base station 504 may instruct the wireless device 502 to monitor SSB2. However, if the base station 504 fails to send the beam instruction, or if the wireless device 502 fails to receive the beam instruction, the wireless device 502 may remain on SSB0 520 (i.e., experiencing reception of signals that are inferior to reception of signals received from SSB2 522). The wireless device 502 and may experience degraded signal quality and/or data throughput as a result.

Figure 5B:
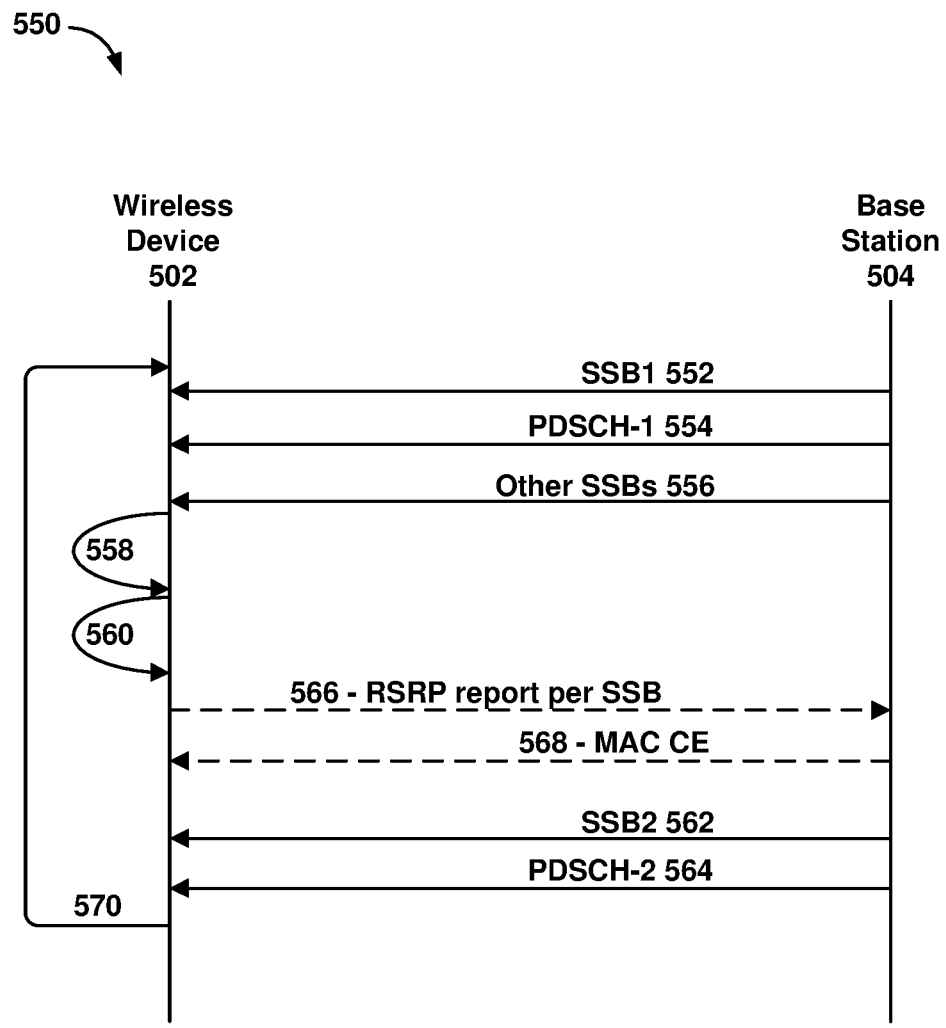
FIG. 5B is a message flow diagram illustrating a method 550 for autonomous beam switching according to various embodiments.

FIG. 5B is a message flow diagram illustrating a method 550 for autonomous beam switching according to various embodiments. With reference to FIGS. 1-5B, the operations of the method 550 may be implemented by a processor (e.g., 210, 212, 214, 216, 218, 252, 260, 428) of a wireless device 502 (e.g., 120a-120e, 200, 320, 120) and/or a base station 504 (e.g., 110a-110d, 402) according to various embodiments.

In some embodiments, the wireless device 502 may receive signals transmitted in a first SSB beam 552 (e.g., 520). The wireless device 502 also may measure signal parameters of signals received from the first SSB beam 552 as a serving beam of a base station 504. The wireless device 502 also may receive data in signals transmitted in a first data beam 554 (e.g., PDSCH-1) that is QCL with the first SSB beam 552. In some embodiments, the wireless device 502 may receive signals transmitted in one or more other SSB beams 556 (e.g., 522, 524) of the base station 504. The wireless device 502 may measure signal parameters of signals received from the one or more other SSB beams 556.

The wireless device may determine 558 whether a difference in the measured signal parameters of signals transmitted in the first SSB beam and a second SSB beam of the base station satisfies a signal quality difference threshold. In some embodiments, the wireless device may determine whether the difference in the measured signal parameters of signals received from the first SSB beam 552 and the second SSB beam (i.e., one of the other SSB beams 556) satisfies the signal quality difference threshold before receiving a MAC-CE or without receiving the MAC-CE from the base station 504.

For example, conventionally, the wireless device 502 may send to the base station 504 one or more reports 566 including information about reception of signals received from the first SSB beam 552 and the other SSB beams 556, and the base station 504 may send to the wireless device 502 a MAC-CE 568 including an instruction to switch to the second SSB beam. However, when configured to perform an autonomous beam switch to the second SSB beam, the wireless device 502 need not rely on the instruction from the base station, which the base station 504 may not send, or even if sent, the wireless device 502 may not receive. In various embodiments, the wireless device may determine whether the difference in the measured signal parameters of signals received from the first SSB beam and a second SSB beam of the base station satisfies the signal quality difference threshold before receiving the MAC-CE 568 or without receiving the MAC-CE 568.

In response to determining that the difference in the measured signal parameters of signals received from the first SSB beam and the second SSB beam of the base station satisfies the signal quality difference threshold, the wireless device 502 may autonomously switch 560 to monitoring the second SSB beam 562 of the base station as the serving beam. In some embodiments, the wireless device 502 also may receive data in signals received from a second data beam 564 (e.g., PDSCH-2) that is QCL with the second SSB beam 562.

The wireless device may repeat 570 the operations 552-564 from time to time.

Figure 6:
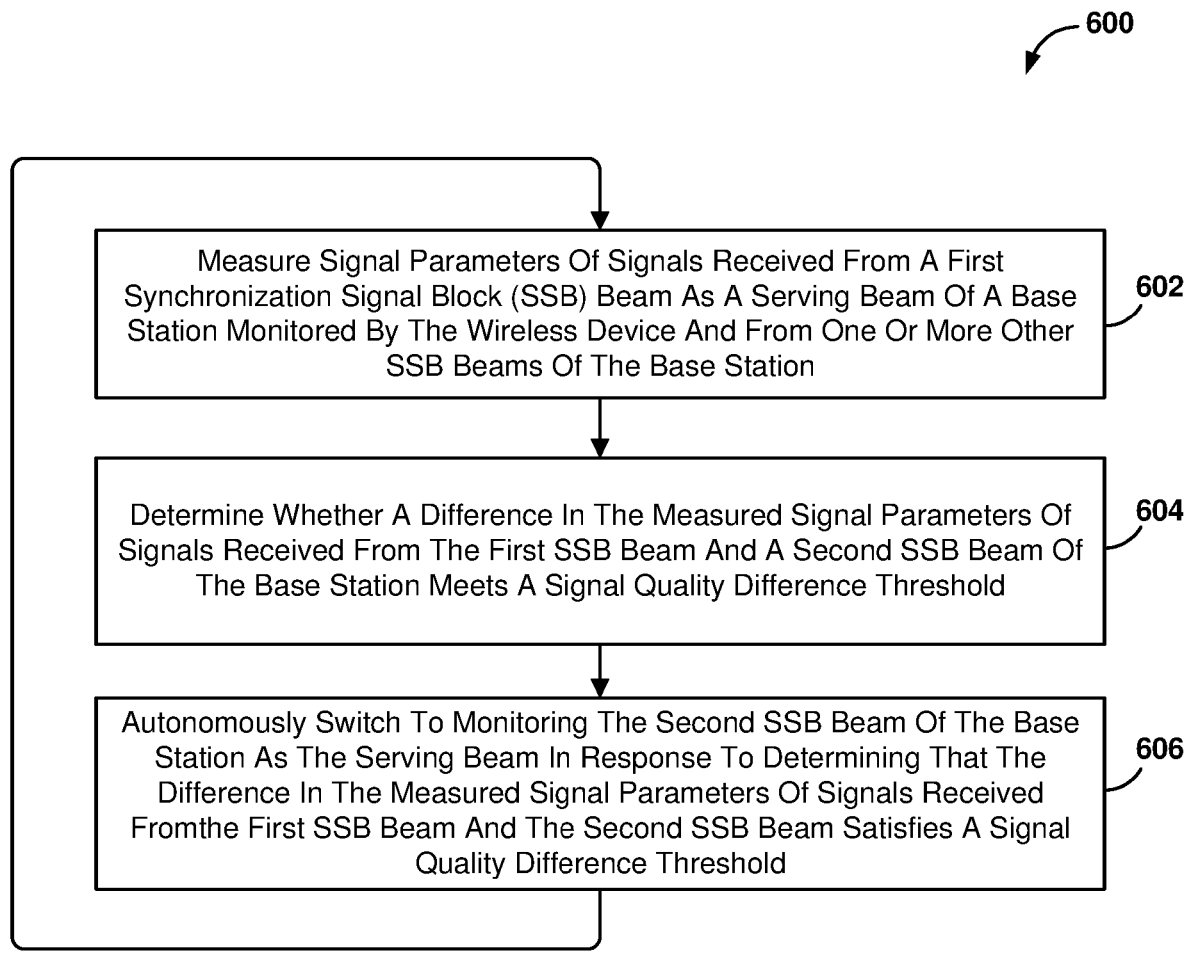
FIG. 6 is a process flow diagram illustrating a method 600 that may be performed by a processor of a wireless device for autonomous beam switching according to various embodiments.

FIG. 6 is a process flow diagram illustrating a method 600 that may be performed by a processor of a wireless device for autonomous beam switching according to various embodiments. With reference to FIGS. 1-6, the method 600 may be implemented by a processor (e.g., 210, 212, 214, 216, 218, 252, 260, 428) of a wireless device (e.g., 120a-120e, 200, 320, 120).

In block 602, the processor may measure signal parameters of signals received from a first synchronization signal block (SSB) beam of a base station as a serving beam monitored by the wireless device and one or more other SSB beams of the base station. For example, the processor may measure signal parameters of signals received from the SSB beams 520-524 (FIG. 5). In various embodiments, the processor may determine or measure one or more of a wide variety of parameters, including a serving SSB identifier, a cell identifier of a serving cell, a signal strength of signals received from each SSB beam, a signal quality of signals received from each SSB beam, a difference in reference signal received power (RSRP) of signals received from each SSB beam, a difference in reference signal received quality (RSRQ) of signals received from each SSB beam, a difference in signal-to-noise ratio (SNR) of signals received from each SSB beam, an initial block error rate (iBLER) of signals received from each SSB beam, a residual block error rate (rBLER) of signals received from each SSB beam, a mobility of the wireless device at a time of measurement, an orientation of the wireless device at the time of measurement, a number of detectible SSB beams, a number of configured SSB beams, a beam status report configured by the base station, a number of SSB status reports sent by the wireless device to the base station, a number and frequency of autonomous SSB switches performed by the wireless device, a number and frequency of SSB beam switches performed in response to an instruction from the base station, an average duration between transmission of a beam status report and receipt of a beam switch instruction from the base station, beam failure detection and recovery statistics, frequency and time tracking loop statistics, a mobile network code (MNC) or mobile country code (MCC) of a communication network associated with the base station, or an infrastructure vendor associated with the base station. In some embodiments, the processor may determine a trend of one or more of the above and/or a historical performance of signals received from an SSB beam at the wireless device's location.

In some embodiments, the wireless device may receive data in signals received from a first data beam that is QCL with the first SSB beam. Means for performing functions of the operations in block 602 may include the processor (e.g., 210, 212, 214, 216, 218, 252, 260, 432) coupled to a wireless transceiver (e.g., 266).

In block 604, the processor may determine whether a difference in the measured signal parameters of signals received from the first SSB beam and from a second SSB beam of the base station satisfies a signal quality difference threshold. In some embodiments, the processor may determine whether the difference in the measured signal parameters of signals received from the first SSB beam and the second SSB beam of the base station satisfies the signal quality difference threshold before receiving a MAC Control Element (MAC-CE) instructing the wireless device to switch the serving beam, or without receiving the MAC-CE from the base station. For example, the processor may determine whether a difference in the measured signal parameters of signals received from SSB0 520 and SSB2 524 satisfies the signal quality difference threshold. Means for performing functions of the operations in block 604 may include the processor (e.g., 210, 212, 214, 216, 218, 252, 260, 432).

In block 606, the processor may autonomously switch to monitoring signals received from the second SSB beam of the base station as the serving beam in response to determining that the difference in the measured signal parameters of signals received from the first SSB beam and a second SSB beam of the base station satisfies a signal quality difference threshold. For example, the processor may autonomously switch from monitoring SSB0 520 to monitoring SSB2 524 in response to determining that the difference in the measured signal parameters of signals received from the SSB0 520 and SSB2 524 satisfies the signal quality difference threshold. Thus, if the wireless device has not received a MAC-CE from the base station to switch the serving beam when the processor determines that the difference in the measured signal parameters of signals received from the first SSB beam and a second SSB beam of the base station satisfies a signal quality difference threshold, the processor autonomously switches to monitoring the second SSB beam of the base station as the serving beam. On the other hand, if the wireless device receives a MAC-CE from the base station to switch the serving beam before the difference in the measured signal parameters of signals received from the first SSB beam and a second SSB beam of the base station satisfies the signal quality difference threshold, the wireless device will switch serving beams based on the MAC-CE in the conventional manner.

In some embodiments, after autonomously switching to monitoring the second SSB beam, the processor may receive data in signals received from a second data beam that is QCL with the second SSB beam. Means for performing functions of the operations in block 606 may include the processor (e.g., 210, 212, 214, 216, 218, 252, 260, 432) coupled to a wireless transceiver (e.g., 266).

The processor may repeat the operations of blocks 602-606 from time to time.

FIGS. 7-12 are process flow diagrams illustrating operations 700, 800, 900, 1000, 1100, 1200 that may be performed by a processor of a wireless device as part of a method for processing data using computing resources of a remote network computing device according to various embodiments. With reference to FIGS. 1-12, the operations 700, 800, 900, 1000, 1100, 1200 may be implemented by a processor (e.g., 210, 212, 214, 216, 218, 252, 260, 428) of a wireless device (e.g., 120a-120e, 200, 320, 120).

Figure 7:
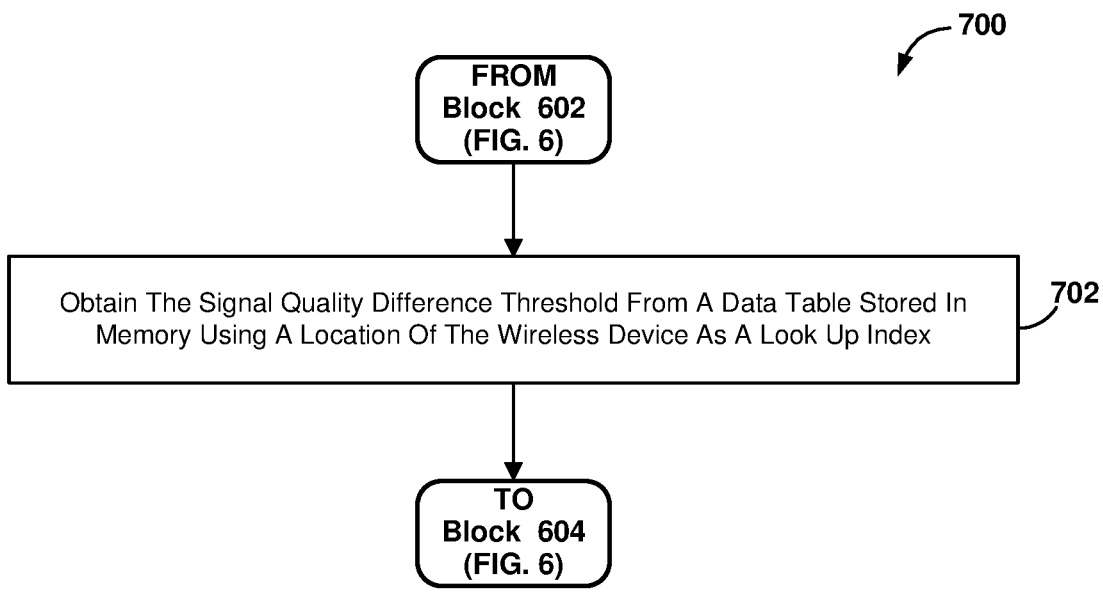
FIGS. 7-13 are process flow diagrams illustrating operations that may be performed by a processor of a wireless device as part of a method for autonomous beam switching according to some embodiments.

Referring to operations 700 illustrated in FIG. 7, following the operations of block 602 of the method 600 (FIG. 6), the processor may obtain the signal quality difference threshold from a data table stored in memory using a location of the wireless device as a look up index in block 702. For example, the processor may retrieve from memory a table, index, list, or another suitable data structure the signal quality difference threshold. In some embodiments, the processor may use a location of the wireless device as an index to obtain the signal quality difference threshold. In some embodiments, the processor may use as an index to look up the signal quality difference threshold global positioning system (GPS) data, a geofence location (such as a geofence identifier), a network-based approximate location, or other suitable location information. Means for performing functions of the operations in block 702 may include the processor (e.g., 210, 212, 214, 216, 218, 252, 260, 432).

The processor may then perform the operations of block 604 of the method 600 (FIG. 6) as described.

Figure 8:
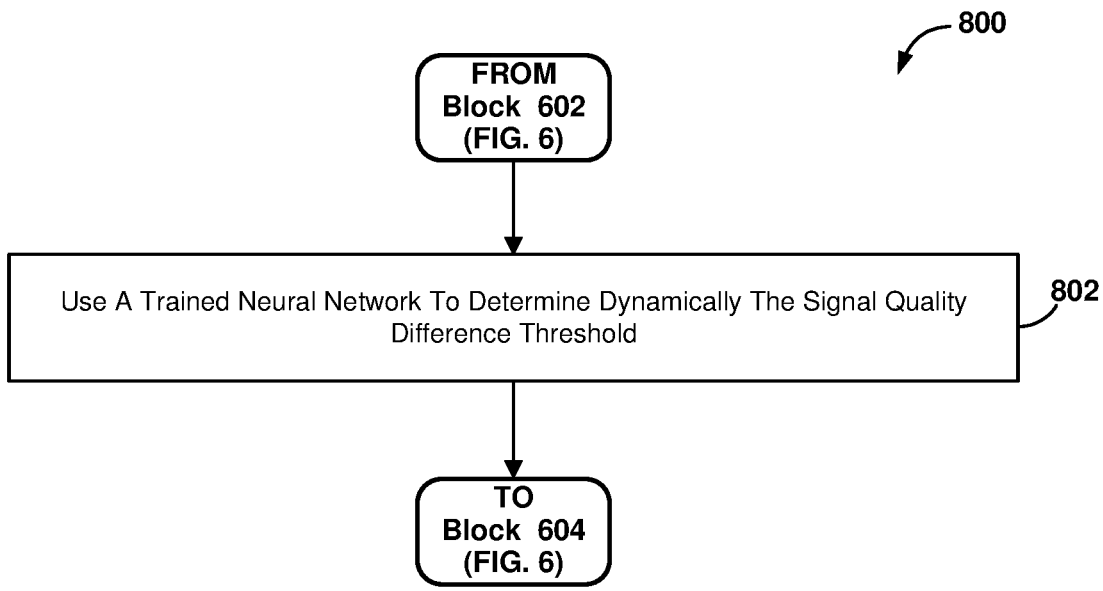

Referring to operations 800 illustrated in FIG. 8, following the operations of block 602 of the method 600 (FIG. 6), the processor may use a trained neural network to determine dynamically the signal quality difference threshold in block 802. Means for performing functions of the operations in block 802 may include the processor (e.g., 210, 212, 214, 216, 218, 252, 260, 432).

The processor may then perform the operations of block 604 of the method 600 (FIG. 6) as described.

Figure 9:
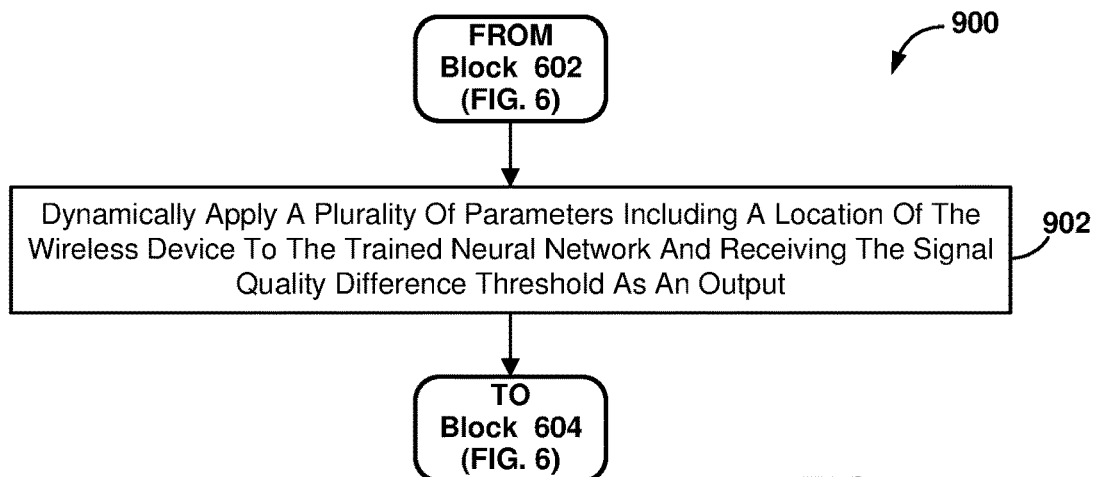

Referring to operations 900 illustrated in FIG. 9, following the operations of block 602 of the method 600 (FIG. 6), the processor may dynamically apply a plurality of parameters including a location of the wireless device to the trained neural network and receiving the signal quality difference threshold as an output in block 902. Means for performing functions of the operations in block 902 may include the processor (e.g., 210, 212, 214, 216, 218, 252, 260, 432).

The processor may then perform the operations of block 604 of the method 600 (FIG. 6) as described.

Figure 10:
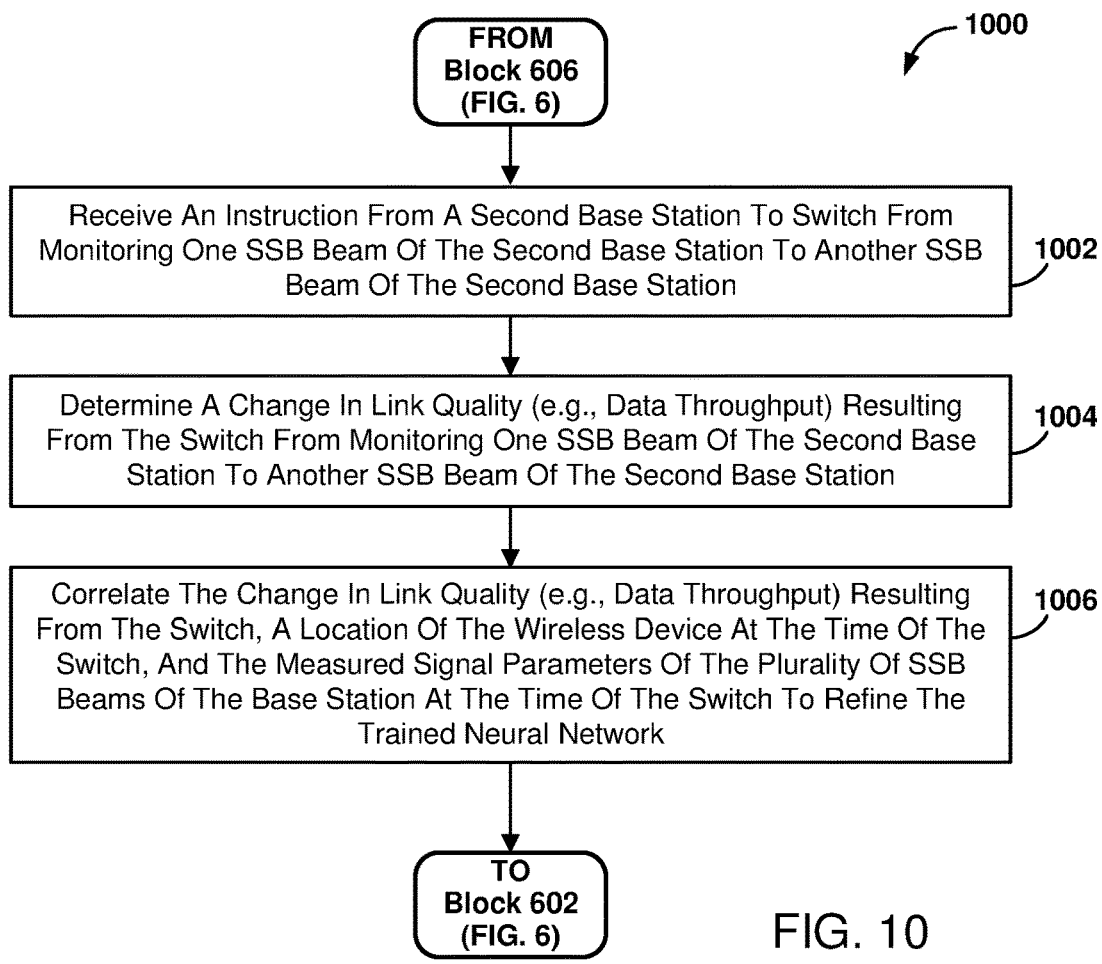

Referring to operations 1000 illustrated in FIG. 10, the wireless device may perform operations to refine the trained neural network. In some embodiments, following the operations of block 606 of the method 600 (FIG. 6), the processor may receive an instruction from a second base station to switch from monitoring one SSB beam of the second base station to another SSB beam of the second base station in block 1002. Means for performing functions of the operations in block 1002 may include the processor (e.g., 210, 212, 214, 216, 218, 252, 260, 432) coupled to a wireless transceiver (e.g., 266).

In block 1004, the processor may determine a change in link quality (e.g., data throughput) resulting from the switch from monitoring one SSB beam of the second base station to another SSB beam of the second base station. For example, the processor may determine that switching to the new SSB beam resulted in an increase, or in a decrease, in data throughput, iBLER, rBLER, or other link quality parameter as compared with the link quality or performance of the previous SSB beam. Means for performing functions of the operations in block 1004 may include the processor (e.g., 210, 212, 214, 216, 218, 252, 260, 432).

In block 1006, the processor may correlate the change in link quality (e.g., data throughput) resulting from the switch, a location of the wireless device at the time of the switch, and the measured signal parameters of signals received from the plurality of SSB beams of the base station at the time of the switch to refine the trained neural network. Means for performing functions of the operations in block 1006 may include the processor (e.g., 210, 212, 214, 216, 218, 252, 260, 432).

The processor may then perform the operations of block 602 of the method 600 (FIG. 6) as described.

Figure 11:
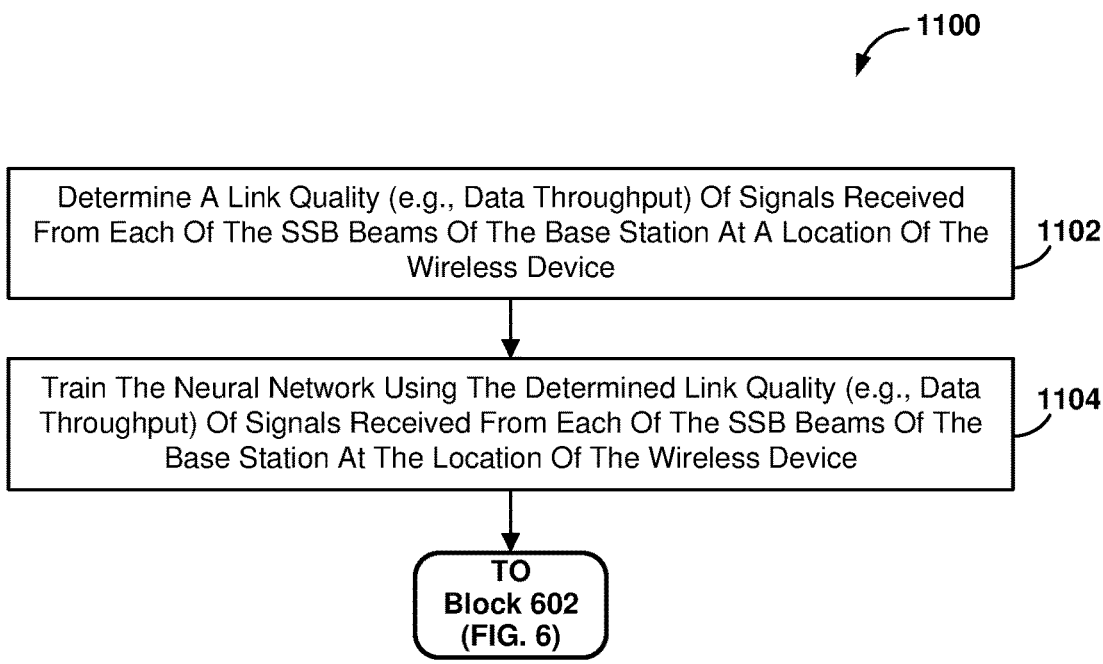

Referring to operations 1100 illustrated in FIG. 11, the wireless device may perform operations to train the neural network. In some embodiments, the processor may determine a link quality (e.g., data throughput) of signals received from each SSB beam of the base station at a location of the wireless device in block 1102. Means for performing functions of the operations in block 1102 may include the processor (e.g., 210, 212, 214, 216, 218, 252, 260, 432) coupled to a wireless transceiver (e.g., 266).

In block 1104, the processor may train the neural network using the determined link quality (e.g., data throughput) of signals received from each SSB beam of the base station at the location of the wireless device. Means for performing functions of the operations in block 1104 may include the processor (e.g., 210, 212, 214, 216, 218, 252, 260.432).

The processor may then perform the operations of block 602 of the method 600 (FIG. 6) as described.

Figure 12:
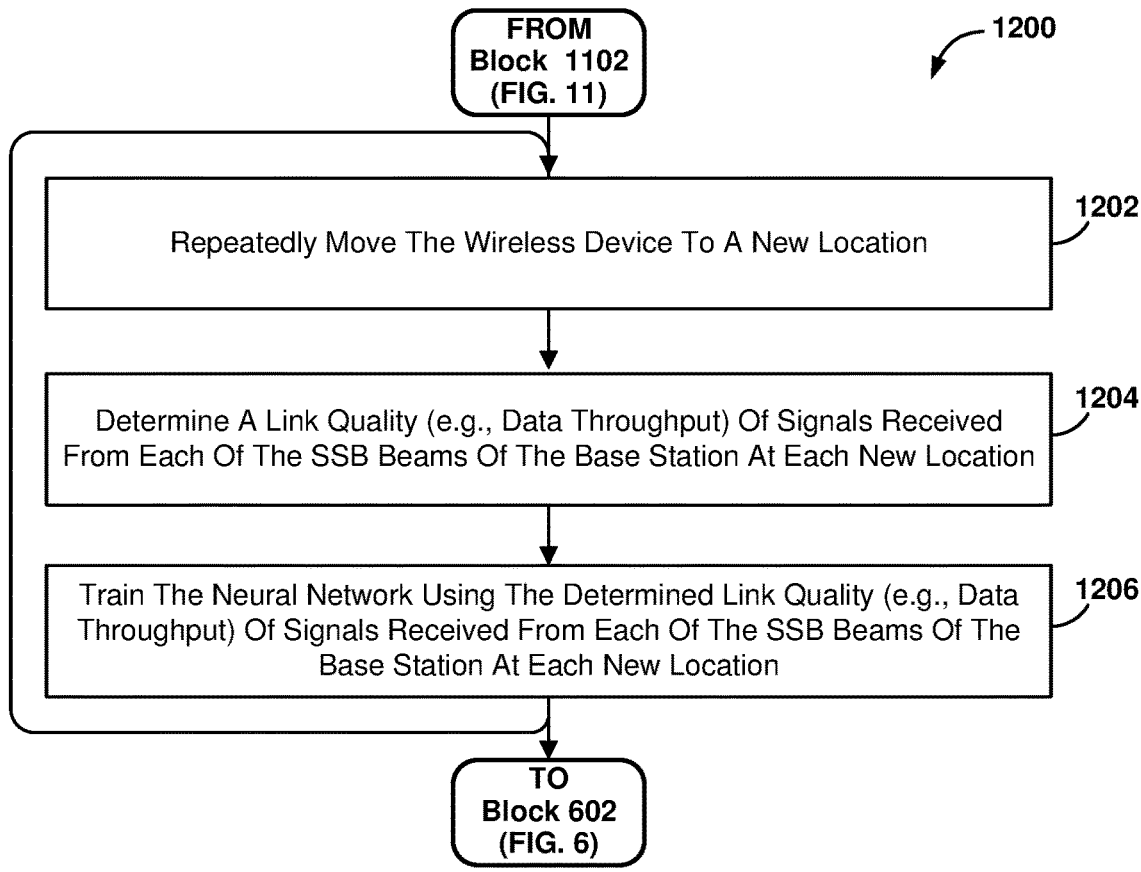

Referring to operations 1200 illustrated in FIG. 12, the wireless device may perform operations to train the neural network. In some embodiments, following the operations of block 1102 (FIG. 11), the processor may repeatedly move the wireless device to a new location in block 1202. Means for performing functions of the operations in block 1202 may include the processor (e.g., 210, 212, 214, 216, 218, 252, 260, 432).

In block 1204, the processor may determine a data throughput or other link quality parameter of signals received from each SSB beam of the base station at each new location. Means for performing functions of the operations in block 1202 may include the processor (e.g., 210, 212, 214, 216, 218, 252, 260, 432) coupled to a wireless transceiver (e.g., 266).

In block 1206, the processor may the neural network using the determined data throughput or other link quality parameter of signals received from each SSB beam of the base station at each new location. Means for performing functions of the operations in block 1204 may include the processor (e.g., 210, 212, 214, 216, 218, 252, 260, 432).

The processor may then perform the operations of block 602 of the method 600 (FIG. 6) as described.

Figure 13:
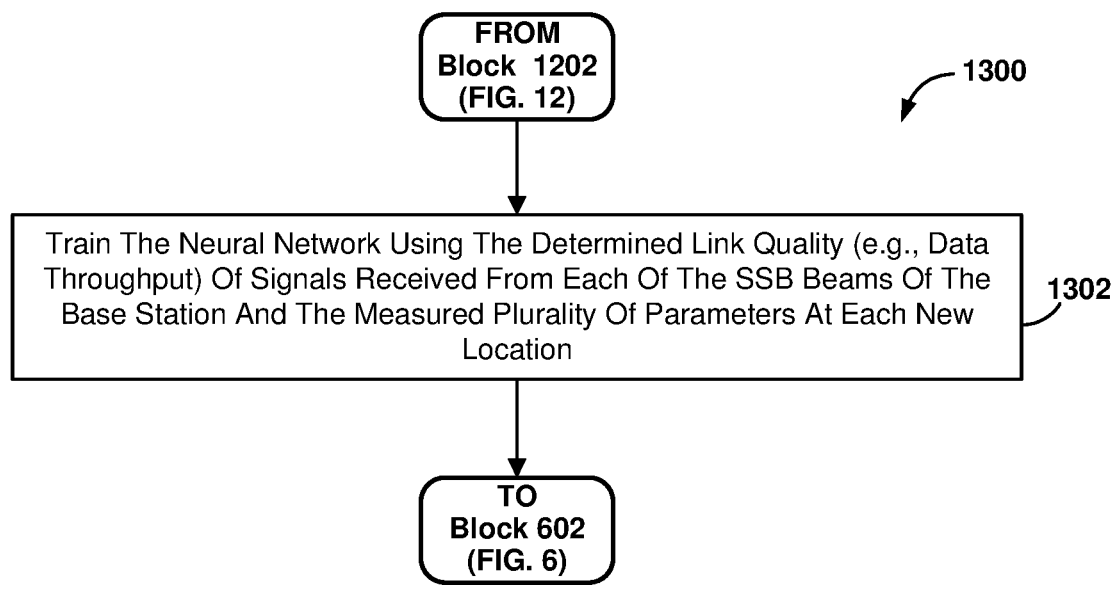

Referring to operations 1300 illustrated in FIG. 13, the wireless device may perform operations to train the neural network. In some embodiments, following the operations of block 1202 (FIG. 12), the processor may train the neural network using the determined data throughput or other link quality parameter of signals received from each SSB beam of the base station and the measured one or more parameters at each new location in block 1302. Means for performing functions of the operations in block 1302 may include the processor (e.g., 210, 212, 214, 216, 218, 252, 260, 432).

The processor may then perform the operations of block 602 of the method 600 (FIG. 6) as described.

Figure 14:
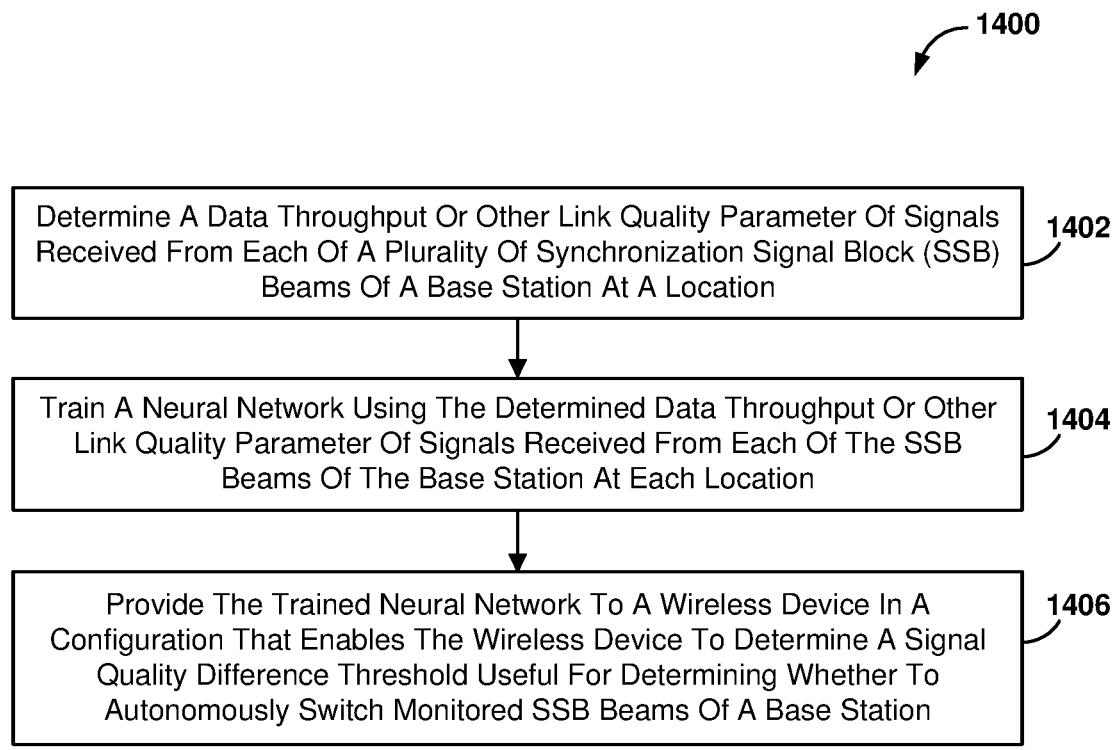
FIG. 14 is a process flow diagram illustrating a method that may be performed by a processor of a computing device for training a neural network for use by a wireless device in autonomous beam switching in accordance with various embodiments.

FIG. 14 is a process flow diagram illustrating a method 1400 that may be performed by a computing device (e.g., 402) for training a neural network for use by a wireless device in autonomous beam switching according to various embodiments. With reference to FIGS. 1-14, the method 1400 may be implemented by a processor (e.g., 210, 212, 214, 216, 218, 252, 260, 428) of a computing device (e.g., 402) that includes a wireless transceiver (e.g., 406) configured to measure signal qualities of various SSB beams from base stations.

In block 1402, the processor may determine a data throughput or other link quality parameter of signals received from each of a plurality of synchronization signal block (SSB) beams of a base station at a location of a wireless device. Means for performing functions of the operations in block 1402 may include the processor (e.g., 210, 212, 214, 216, 218, 252, 260, 428) coupled to the wireless transceiver (e.g., 406).

In block 1404, the processor may train the neural network using the determined data throughput or other link quality parameter of signals received from each SSB beam of the base station at the location of the computing device. Means for performing functions of the operations in block 1404 may include the processor (e.g., 210, 212, 214, 216, 218, 252, 260, 428) of the computing device (e.g., 402) coupled to a wireless transceiver (e.g., 406).

In block 1406, the processor may provide the trained neural network to the wireless device in a configuration that enables the wireless device to determine a signal quality difference threshold useful for determining whether to autonomously switch monitored SSB beams of a base station. Means for performing functions of the operations in block 1406 may include the processor (e.g., 210, 212, 214, 216, 218, 252, 260, 428) of the computing device (e.g., 402) coupled to a wireless transceiver (e.g., 406).

Figure 15:
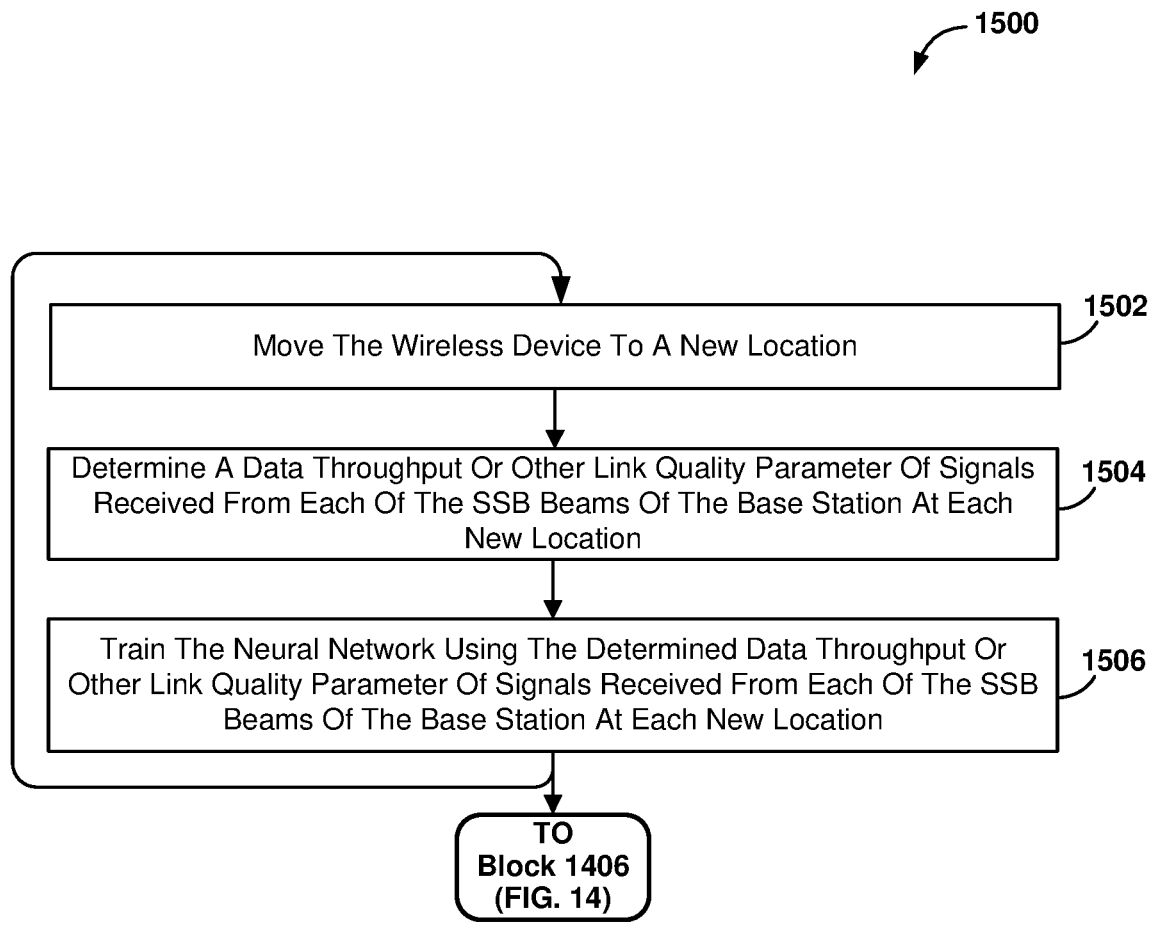
FIGS. 15 and 16 are process flow diagrams illustrating operations that may be performed by a processor of a computing device for training a neural network for use by a wireless device in autonomous beam switching in accordance with some embodiments.
Figure 16:
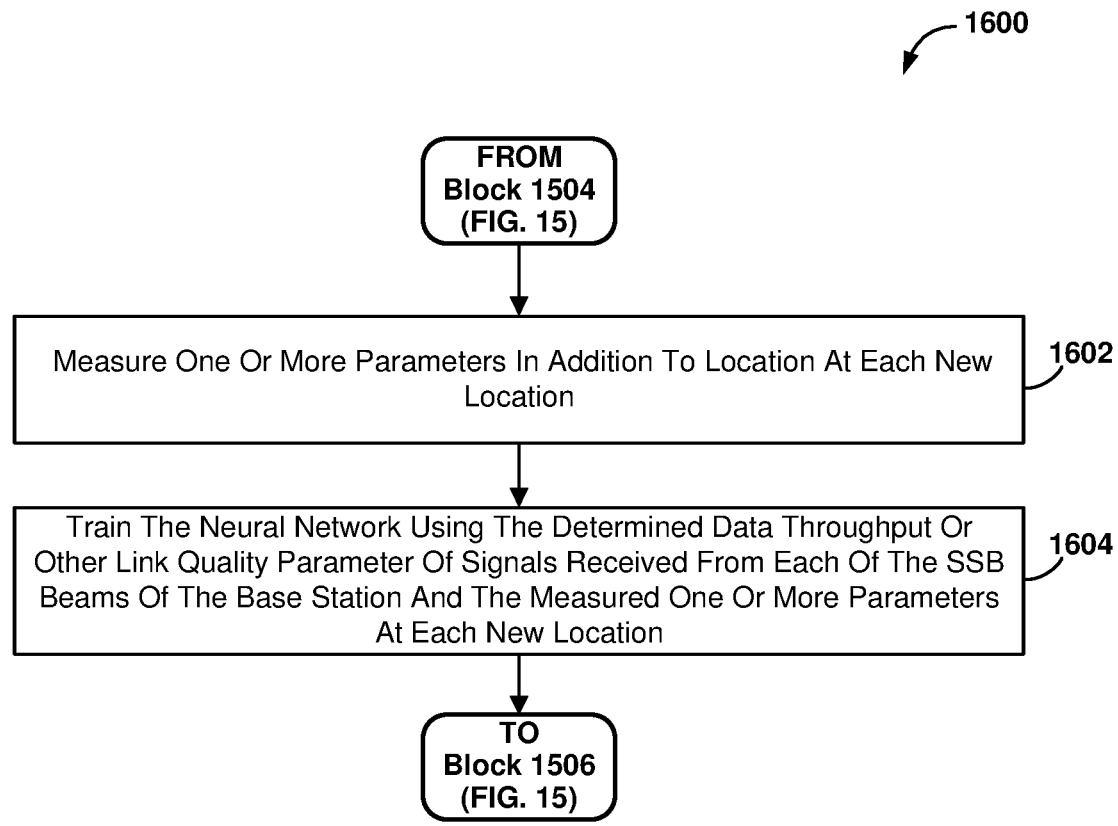

FIGS. 15 and 16 are process flow diagrams illustrating operations 1500 and 1600 that may be performed by a processor of a computing device as part of a method of training a neural network for use by a wireless device in autonomous beam switching according to various embodiments. With reference to FIGS. 1-16, the operations 1500 and 1600 may be implemented by a processor (e.g., 210, 212, 214, 216, 218, 252, 260, 428) of the computing device (e.g., 402).

Referring to operations 1500 illustrated in FIG. 15, the computing device may be moved to a new location in block 1502.

In block 1504, the processor may determine a data throughput or other link quality parameter of signals received from each SSB beam of the base station at each new location. Means for performing functions of the operations in block 1504 may include the processor (e.g., 210, 212, 214, 216, 218, 252, 260, 428) of the computing device (e.g., 402) coupled to a wireless transceiver (e.g., 406).

In block 1506, the processor may train the neural network using the determined data throughput or other link quality parameter of signals received from each SSB beam of the base station at each new location. Means for performing functions of the operations in block 1506 may include the processor (e.g., 210, 212, 214.216, 218, 252, 260, 432).

The processor may then perform the operations of block 1406 of the method 1400 (FIG. 14) as described.

Referring to operations 1600 illustrated in FIG. 16, following the operations of block 1504 (FIG. 15), the processor may measure one or more parameters in addition to the location of the wireless device at each new location in block 1602. For example, the processor may measure signal parameters of signals received from the SSB beams 520-524 (FIG. 5). In some embodiments, the processor may determine or measure one or more of a wide variety of parameters, including a serving SSB identifier, a cell identifier of a serving cell, a signal strength of signals received from each SSB beam, a signal quality of signals received from each SSB beam, a difference in reference signal received power (RSRP) of signals received from each SSB beam, a difference in reference signal received quality (RSRQ) of signals received from each SSB beam, a difference in signal-to-noise ratio (SNR) of signals received from each SSB beam, an initial block error rate (iBLER) of signals received from each SSB beam, a residual block error rate (rBLER) of signals received from each SSB beam, a mobility of the computing device at a time of measurement, an orientation of the computing device at the time of measurement, a number of detectible SSB beams, a number of configured SSB beams, a beam status report configured by the base station, an average duration between transmission of a beam status report and receipt of a beam switch instruction from the base station, beam failure detection and recovery statistics, frequency and time tracking loop statistics, a mobile network code (MNC) or mobile country code (MCC) of a communication network associated with the base station, or an infrastructure vendor associated with the base station. In some embodiments, the processor may determine a trend of one or more of the above and/or a historical performance of an SSB beam at the wireless device's location. Means for performing functions of the operations in block 1602 may include the processor (e.g., 210, 212, 214, 216, 218, 252, 260, 428) of the computing device (e.g., 402) coupled to a wireless transceiver (e.g., 406).

In block 1604, the processor may train the neural network using the determined data throughput or other link quality parameter of signals received from each SSB beam of the base station and the measured one or more parameters at each new location. Means for performing functions of the operations in block 1604 may include the processor (e.g., 210, 212, 214, 216, 218, 252, 260, 428) of the computing device (e.g., 402).

Figure 17:
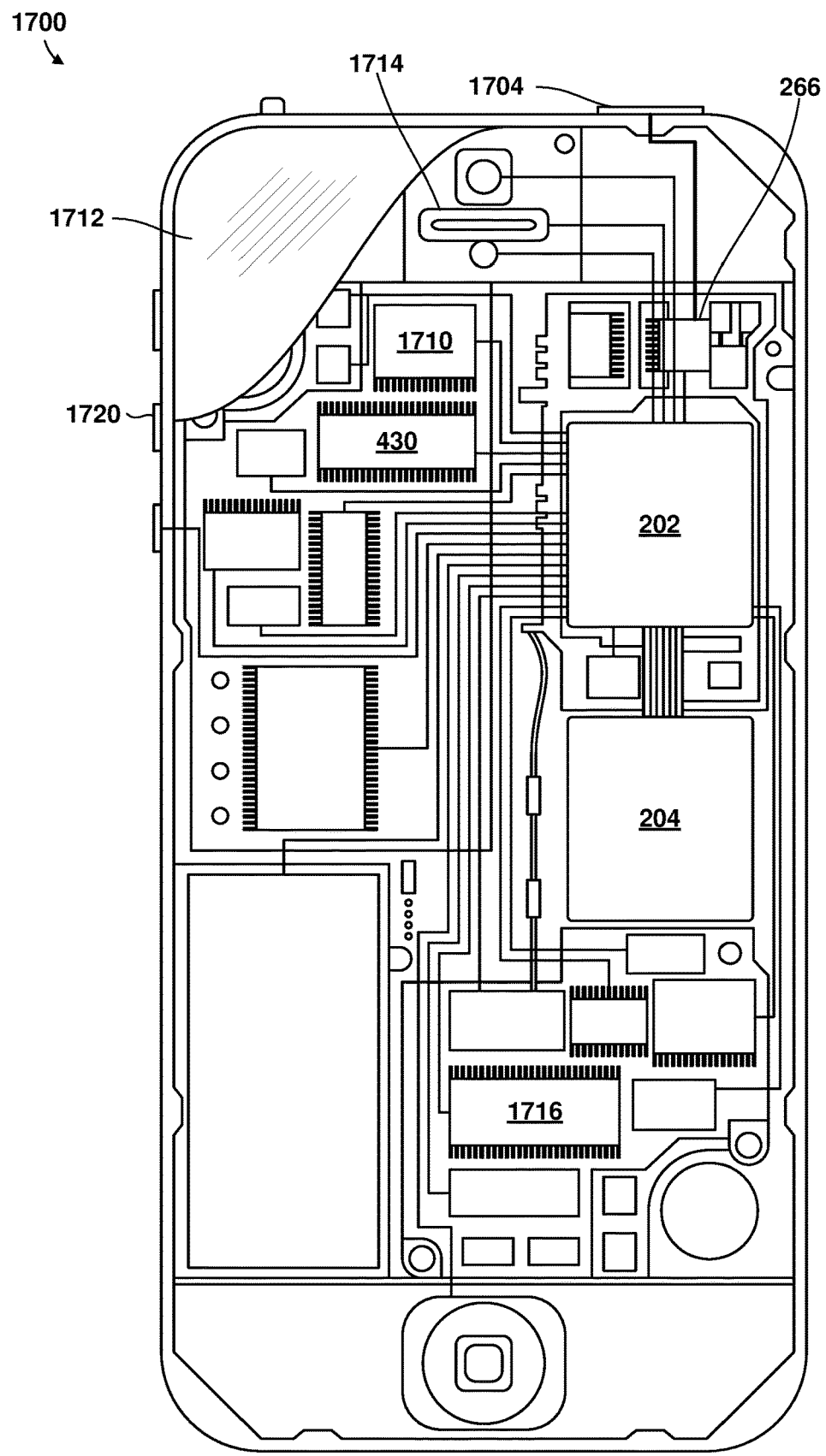
FIG. 17 is a component block diagram of a wireless device suitable for use with some embodiments.

Various embodiments, including the methods and operations 550, 600, 700, 800, 900, 1000, 1100, 1200, 1300, may be performed in a variety of wireless devices (e.g., the wireless device 120a-120e, 200, 320, 120), an example of which is illustrated in FIG. 17 that is a component block diagram of a wireless device 1700 suitable for use with various embodiments. With reference to FIGS. 1-17, a wireless device 1700 may include a first SOC 202 (e.g., a SOC-CPU) coupled to a second SOC 204 (e.g., a 5G capable SOC). The first and second SOCs 202, 204 may be coupled to internal memory 430, 1716, a display 1712, and to a speaker 1714. Additionally, the wireless device 1700 may include an antenna 1704 for sending and receiving electromagnetic radiation that may be connected to a wireless data link and/or cellular telephone transceiver 266 coupled to one or more processors in the first and/or second SOCs 202, 204. The wireless device 1700 may also include menu selection buttons or rocker switches 1720 for receiving user inputs.

The wireless device 1700 also may include a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1710 may include a digital signal processor (DSP) circuit (not shown separately).

Figure 18:
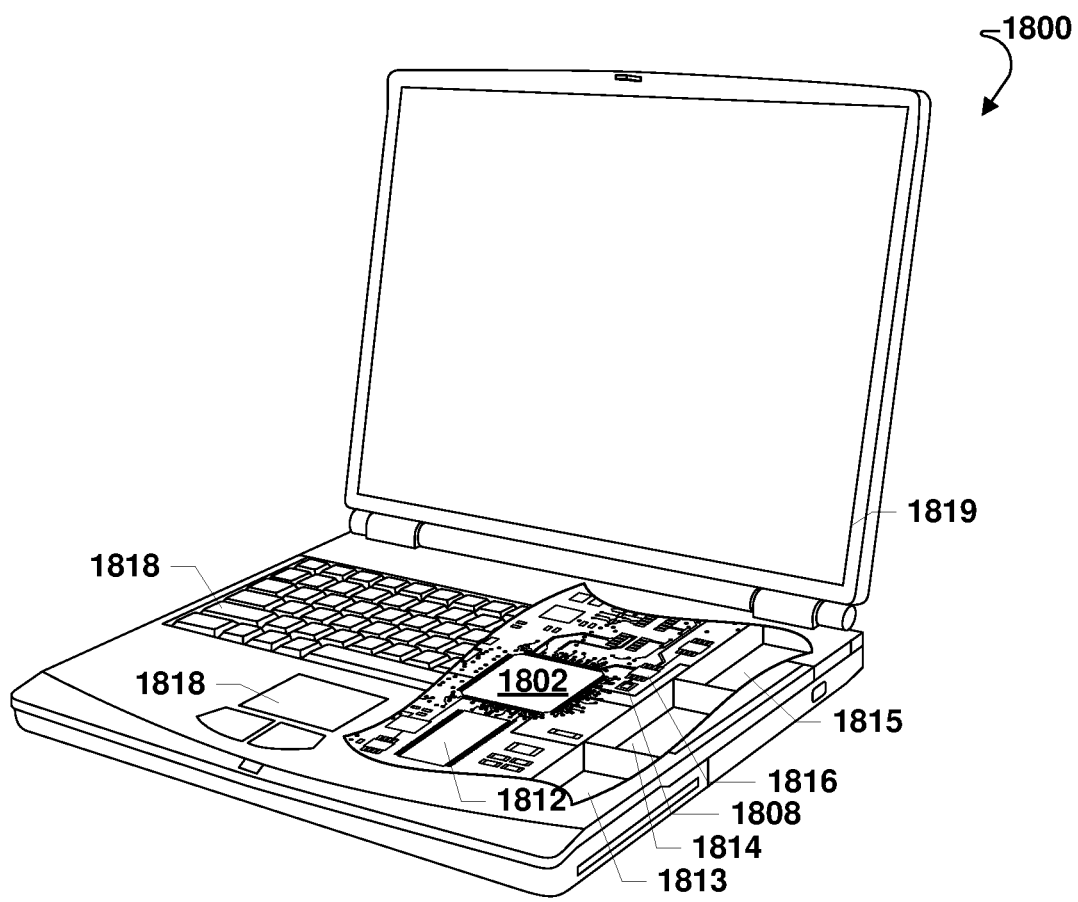
FIG. 18 is a component block diagram of a wireless computing device suitable for use with some embodiments.

Methods and devices for training the neural network described herein in accordance with embodiments described with reference to FIGS. 14-16) may be implemented in a wide variety of computing systems, particularly mobile computing devices equipped with a wireless transceiver, and example of which in the form of a laptop computer 800 is illustrated in FIG. 18. A laptop computer 1800 will typically include a processor 1802 coupled to volatile memory 1812 and a large capacity nonvolatile memory, such as a compact disc (CD) drive 1813 or Flash memory. Additionally, the laptop computer 1800 may have one or more antenna 1808 for sending and receiving electromagnetic radiation that may be connected to a wireless data link and/or cellular telephone transceiver 1816 coupled to the processor 1802. The laptop computer 1800 may also include a floppy disc drive 1814 and a CD drive 1813 coupled to the processor 1812. The laptop computer housing may include a battery 1815, a touchpad touch surface 1818 that serves as the computer's pointing device, a keyboard 1818, and a display 1819 all coupled to the processor 1802. Other configurations of a computing device may include a computer mouse or trackball coupled to the processor (e.g., via a USB input) as are well known, which may also be used in conjunction with the various embodiments.

The processors of the wireless device (e.g., 120, 1700) and the computing device may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Software applications may be stored in the memory (e.g., 426.430, 1716, 1812, 1813, 1814) before processor-executable instructions are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 550, 600, 700, 800, 900, 1000, 1100, 1200, 1300 may be substituted for or combined with one or more operations of the methods and operations 550, 600, 700, 800, 900, 1000, 1100, 1200, 1300.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a processor of a wireless device for autonomous beam switching, including measuring signal parameters of signals received from a first synchronization signal block (SSB) beam as a serving beam of a base station monitored by the wireless device and signals received from one or more other SSB beams of the base station; determining whether a difference in the measured signal parameters of signals received from the first SSB beam and a second SSB beam of the base station satisfies a signal quality difference threshold; and autonomously switching to monitoring the second SSB beam of the base station as the serving beam in response to determining that the difference in the measured signal parameters of signals received from the first SSB beam and the second SSB beam of the base station satisfies a signal quality difference threshold.

Example 2. The method of example 1, in which determining whether a difference in the measured signal parameters of signals received from the first SSB beam and a second SSB beam of the base station satisfies a signal quality difference threshold includes determining whether the difference in the measured signal parameters of signals received from the first SSB beam and the second SSB beam of the base station satisfies the signal quality difference threshold before receiving a MAC Control Element (MAC-CE) instructing the wireless device to switch the serving beam or without receiving the MAC-CE.

Example 3. The method of either of examples 1 and 2, in which autonomously switching to monitoring the second SSB beam of the base station as the serving beam includes switching to monitoring the second SSB beam of the base station before receiving the MAC-CE or without receiving the MAC-CE.

Example 4. The method of any of examples 1-3, including receiving data in signals received from a first data beam that is quasi-co-located (QCL) with the first SSB beam prior to autonomously switching to monitoring the second SSB beam; and receiving data in signals received from a second data beam that is quasi-co-located (QCL) with the second SSB beam after autonomously switching to monitoring the second SSB beam.

Example 5. The method of any of examples 1-4, further including obtaining the signal quality difference threshold from a data table stored in memory using a location of the wireless device as a look up index.

Example 6. The method of any of examples 1-5, further including using a trained neural network to determine the signal quality difference threshold.

Example 7. The method of example 6, in which using a trained neural network to determine the signal quality difference threshold includes dynamically applying a plurality of parameters including a location of the wireless device to the trained neural network and receiving the signal quality difference threshold as an output.

Example 8. The method of either of examples 6 and 7, further including refining the trained neural network by receiving an instruction from a second base station to switch from monitoring one SSB beam of the second base station to another SSB beam of the second base station; determining a change in data throughput or other link quality parameter resulting from the switch from monitoring one SSB beam of the second base station to another SSB beam of the second base station; and correlating the change in data throughput or other link quality parameter resulting from the switch, a location of the wireless device at a time of the switch, and measured signal parameters of signals received from a plurality of SSB beams of the base station at the time of the switch to refine the trained neural network.

Example 9. The method of any of examples 6-8, further including training the neural network by determining a data throughput or other link quality parameter of signals received from each SSB beam of the base station at a location of the wireless device; and training the neural network using the determined data throughput or other link quality parameter of signals received from each SSB beam of the base station at the location of the wireless device.

Example 10. The method of any of examples 6-9, in which training the neural network using the determined data throughput or other link quality parameter of signals received from each SSB beam of the base station at the location of the wireless device includes repeatedly moving the wireless device to a new location, determining a data throughput or other link quality parameter of signals received from each SSB beam of the base station at each new location, and training the neural network using the determined data throughput or other link quality parameter of signals received from each SSB beam of the base station at each new location.

Example 11. The method of example 10, further including measuring one or more parameters in addition to a location of the wireless device at each new location, in which training the neural network using the determined data throughput or other link quality parameter of signals received from each SSB beam of the base station at each new location includes training the neural network using the determined data throughput or other link quality parameter of signals received from each SSB beam of the base station and the measured one or more parameters at each new location.

Example 12. The method of example 11, in which measuring one or more parameters includes determining or measuring one or more of: a serving beam identifier; a cell identifier of a serving cell, a signal strength of signals received from each SSB beam, a signal quality of signals received from each SSB beam; a difference in reference signal received power (RSRP) of signals received from each SSB beam; a difference in reference signal received quality (RSRQ) of signals received from each SSB beam; a difference in signal-to-noise ratio (SNR) of signals received from each SSB beam; an initial block error rate (iBLER) of signals received from each SSB beam; a residual block error rate (rBLER) of signals received from each SSB beam; a mobility of the wireless device at a time of measurement; an orientation of the wireless device at the time of measurement; a number of detectible SSB beams; a number of configured SSB beams; a beam status report configured by the base station; a number of SSB status reports sent by the wireless device to the base station; a number and frequency of autonomous SSB switches performed by the wireless device; a number and frequency of SSB beam switches performed in response to an instruction from the base station; an average duration between transmission of a beam status report and receipt of a beam switch instruction from the base station; beam failure detection and recovery statistics; frequency and time tracking loop statistics; a mobile network code (MNC) or mobile country code (MCC) of a communication network associated with the base station; or an infrastructure vendor associated with the base station.

Example 13. A method performed by a computing device of training a neural network for use by a wireless device in autonomous beam switching, including determining a data throughput or other link quality parameter of signals received from each of signals received from a plurality of synchronization signal block (SSB) beams of a base station at a location of the computing device; training the neural network using the determined data throughput or other link quality parameter of signals received from each SSB beam of the base station at the location of the computing device; and providing the trained neural network to the wireless device in a configuration that enables the wireless device to determine a signal quality difference threshold useful for determining whether to autonomously switch monitored SSB beams of a base station.

Example 14. The method of example 13, further including repeatedly moving the computing device to a new location, determining a data throughput or other link quality parameter of signals received from each SSB beam of the base station at each new location, and training the neural network using the determined data throughput or other link quality parameter of signals received from each SSB beam of the base station at each new location.

Example 15. The method of either of examples 13 or 14, further including measuring one or more parameters in addition to a location of the wireless device at each new location, in which training the neural network using the determined data throughput or other link quality parameter of signals received from each SSB beam of the base station at each new location includes training the neural network using the determined data throughput or other link quality parameter of signals received from each SSB beam of the base station and the measured one or more parameters at each new location.

Example 16. The method of any of examples 13-15, in which measuring one or more parameters includes determining or measuring one or more of: a serving beam identifier; a cell identifier of a serving cell, a signal strength of signals received from each SSB beam, a signal quality of signals received from each SSB beam; a difference in reference signal received power (RSRP) of signals received from each SSB beam; a difference in reference signal received quality (RSRQ) of signals received from each SSB beam; a difference in signal-to-noise ratio (SNR) of signals received from each SSB beam; an initial block error rate (iBLER) of signals received from each SSB beam; a residual block error rate (rBLER) of signals received from each SSB beam; a mobility of the computing device at a time of measurement; an orientation of the computing device at the time of measurement; a number of detectible SSB beams; a number of configured SSB beams; a beam status report configured by the base station; an average duration between transmission of a beam status report and receipt of a beam switch instruction from the base station; beam failure detection and recovery statistics; frequency and time tracking loop statistics; a mobile network code (MNC) or mobile country code (MCC) of a communication network associated with the base station; or an infrastructure vendor associated with the base station.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods described above may be substituted for or combined with one or more operations of the methods described above.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a wireless device for autonomous beam switching, comprising:
    measuring signal parameters of signals received from a first synchronization signal block (SSB) beam as a serving beam of a base station monitored by the wireless device and one or more other SSB beams of the base station;
    determining whether a difference in the measured signal parameters of signals received from the first SSB beam and a second SSB beam of the base station satisfies a signal quality difference threshold associated with a location of the wireless device; and
    autonomously switching to monitoring the second SSB beam of the base station as the serving beam in response to determining that the difference in the measured signal parameters of signals received from the first SSB beam and the second SSB beam of the base station satisfies the signal quality difference threshold.

2. The method of claim 1, wherein determining whether the difference in the measured signal parameters of the signals received from the first SSB beam and the second SSB beam of the base station satisfies the signal quality difference threshold comprises:
    determining whether the difference; in the measured signal parameters of signals received from the first SSB beam and a second SSB beam of the base station satisfies the signal quality difference threshold before receiving a MAC Control Element (MAC-CE) instructing the wireless device to switch the serving beam or without receiving the MAC-CE.

3. The method of claim 1, wherein autonomously switching to monitoring the second SSB beam of the base station as the serving beam comprises switching to monitoring the second SSB beam of the base station before receiving a MAC Control Element (MAC-CE) or without receiving the MAC-CE.

4. The method of claim 1, further comprising:
    receiving data on a first data beam that is quasi-co-located (QCL) with the first SSB beam prior to autonomously switching to monitoring the second SSB beam; and
    receiving data on a second data beam that is quasi-co-located (QCL) with the second SSB beam after autonomously switching to monitoring the second SSB beam.

5. The method of claim 1, further comprising determining the signal quality difference threshold associated with the location of the wireless device comprising obtaining the signal quality difference threshold from a data table stored in memory using the location of the wireless device as a look up index.

6. The method of claim 1, further comprising determining the signal quality difference threshold associated with the location of the wireless device comprising using a trained neural network to determine the signal quality difference threshold.

7. The method of claim 6, wherein using the trained neural network to determine the signal quality difference threshold comprises:
    dynamically applying a plurality of input parameters to the trained neural network to generate output, the input parameters including the location of the wireless device; and
    receiving an indication of the signal quality difference threshold in accordance with the output of the trained neural network.

8. The method of claim 6, further comprising:
    receiving an instruction from a second base station to switch from monitoring one SSB beam of the second base station to another SSB beam of the second base station; and
    refining the trained neural network by correlating:
        the change in data throughput or other link quality parameter resulting from the switch from monitoring one SSB beam of the second base station to another SSB beam of the second base station,
        the location of the wireless device at a time of the switch, and
        measured signal parameters of signals received from a plurality of SSB beams of the base station at the time of the switch.

9. The method of claim 6, further comprising training the neural network by:
    training the neural network using a data throughput or other link quality parameter of signals received from each SSB beam of the base station at the location of the wireless device.

10. The method of claim 9, wherein training the neural network using the data throughput or other link quality parameter of signals received from each SSB beam of the base station at the location of the wireless device comprises:
    repeatedly moving the wireless device to a new location;
    identifying a data throughput or other link quality parameter of signals received from each SSB beam of the base station at each new location; and
    training the neural network using a data throughput or other link quality parameter of signals received from each SSB beam of the base station at each new location.

11. The method of claim 10, further comprising measuring one or more parameters in addition to the location of the wireless device at each new location, wherein training the neural network using the data throughput or other link quality parameter of signals received from each SSB beam of the base station at each new location comprises training the neural network using the data throughput or other link quality parameter of signals received from each SSB beam of the base station and the measured one or more parameters at each new location.

12. The method of claim 11, wherein measuring one or more parameters comprises determining or measuring one or more of:
a serving beam identifier;
a cell identifier of a serving cell, a signal strength of signals received from each SSB beam, a signal quality of signals received from each SSB beam;
a difference in reference signal received power (RSRP) of signals received from each SSB beam;
a difference in reference signal received quality (RSRQ) of signals received from each SSB beam;
a difference in signal-to-noise ratio (SNR) of signals received from each SSB beam;
an initial block error rate (iBLER) of signals received from each SSB beam;
a residual block error rate (rBLER) of signals received from each SSB;
a mobility of the wireless device at a time of measurement;
an orientation of the wireless device at the time of measurement; a number of detectible SSB beams;
a number of configured SSB beams;
a beam status report configured by the base station;
a number of SSB status reports sent by the wireless device to the base station;
a number and frequency of autonomous SSB switches performed by the wireless device;
a number and frequency of SSB beam switches performed in response to an instruction from the base station;
an average duration between transmission of a beam status report and receipt of a beam switch instruction from the base station;
beam failure detection and recovery statistics;
frequency and time tracking loop statistics;
a mobile network code (MNC) or mobile country code (MCC) of a communication network associated with the base station; or
an infrastructure vendor associated with the base station.

13. A method performed by a computing device of training a neural network for use by a wireless device in autonomous beam switching, comprising:
training the neural network using a data throughput or other link quality parameter of signals received from each SSB beam of a base station at a location of the computing device; and
providing the trained neural network to the wireless device in a configuration that enables the wireless device to determine a signal quality difference threshold associated with a location of the wireless device and determine whether to autonomously switch monitored SSB beams of a base station.

14. The method of claim 13, further comprising repeatedly moving the computing device to a new location, determining a data throughput or other link quality parameter of signals received from each SSB beam of the base station at each new location, and training the neural network using the data throughput or other link quality parameter of signals received from each SSB beam of the base station at each new location.

15. The method of claim 13, further comprising measuring one or more parameters in addition to the location of the wireless device at each new location,
wherein training the neural network using the data throughput or other link quality parameter of signals received from each SSB beam of the base station at each new location comprises training the neural network using the data throughput or other link quality parameter of signals received from each SSB beam of the base station and the measured one or more parameters at each new location.

16. The method of claim 13, wherein measuring one or more parameters comprises determining or measuring one or more of:
a serving beam identifier;
a cell identifier of a serving cell, a signal strength of signals received from each SSB beam, a signal quality of signals received from each SSB beam;
a difference in reference signal received power (RSRP) of signals received from each SSB beam;
a difference in reference signal received quality (RSRQ) of signals received from each SSB beam;
a difference in signal-to-noise ratio (SNR) of signals received from each SSB beam;
an initial block error rate (iBLER) of signals received from each SSB beam;
a residual block error rate (rBLER) of signals received from each SSB
a mobility of the computing device at a time of measurement;
an orientation of the computing device at the time of measurement; a number of detectible SSB beams;
a number of configured SSB beams;
a beam status report configured by the base station;
an average duration between transmission of a beam status report and receipt of a beam switch instruction from the base station; beam failure detection and recovery statistics; frequency and time tracking loop statistics;
a mobile network code (MNC) or mobile country code (MCC) of a communication network associated with the base station; or
an infrastructure vendor associated with the base station.

17. A wireless device, comprising:
a processor configured with processor-executable instructions to:
measure signal parameters of signals received from a first synchronization signal block (SSB) beam as a serving beam of a base station monitored by the wireless device and one or more other SSB beams of the base station;
determine whether a difference in the measured signal parameters of signals received from the first SSB beam and a second SSB beam of the base station satisfies a signal quality difference threshold associated with a location of the wireless device; and
autonomously switch to monitoring the second SSB beam of the base station as the serving beam in response to determining that the difference in the measured signal parameters of signals received from the first SSB beam and the second SSB beam of the base station satisfies the signal quality difference threshold.

18. The wireless device of claim 17, wherein the processor is further configured with processor-executable instructions to determine whether the difference in the measured signal parameters of the signals received from the first SSB beam and the second SSB beam of the base station satisfies the signal quality difference threshold before receiving a MAC Control Element (MAC-CE) instructing the wireless device to switch the serving beam or without receiving the MAC-CE.

19. The wireless device of claim 17, wherein the processor is further configured with processor-executable instructions to switch to monitoring the second SSB beam of the base station before receiving a MAC Control Element (MAC-CE) or without receiving the MAC-CE instructing the wireless device to switch the serving beam.

20. The wireless device of claim 17, wherein the processor is further configured with processor-executable instructions to:
receive data in signals received from a first data beam that is quasi-co- located (QCL) with the first SSB beam prior to autonomously switching to monitoring the second SSB beam; and
receive data in signals received from a second data beam that is quasi-co- located (QCL) with the second SSB beam after autonomously switching to monitoring the second SSB beam.

21. The wireless device of claim 17, wherein the processor is further configured with processor-executable instructions to determine the signal quality difference threshold associated with the location of the wireless device by obtaining the signal quality difference threshold from a data table stored in memory using the location of the wireless device as a look up index.

22. The wireless device of claim 17, wherein the processor is further configured with processor-executable instructions to determine the signal quality difference threshold associated with the location of the wireless device by using a trained neural network to determine the signal quality difference threshold.

23. The wireless device of claim 22, wherein the processor is further configured with processor-executable instructions to:
dynamically apply a plurality of input parameters to the trained neural network to generate output, the input parameters including the location of the wireless device; and
receiving an indication of the signal quality difference threshold in accordance with the output of the trained neural network.

24. The wireless device of claim 22, wherein the processor is further configured with processor-executable instructions to:
receive an instruction from a second base station to switch from monitoring one SSB beam of the second base station to another SSB beam of the second base station; and
refine the trained neural network by correlating:
the change in data throughput or other link quality parameter resulting from the switch from monitoring one SSB beam of the second base station to another SSB beam of the second base station,
the location of the wireless device at a time of the switch, and
measured signal parameters of signals received from a plurality of SSB beams of the base station at the time of the switch.

25. The wireless device of claim 22, wherein the processor is further configured with processor-executable instructions to:
train the neural network using a data throughput or other link quality parameter of signals received from each SSB beam of the base station at the location of the wireless device.

26. The wireless device of claim 25, wherein the processor is further configured with processor-executable instructions to:
repeatedly move the wireless device to a new location;
identify a data throughput or other link quality parameter of signals received from each SSB beam of the base station at each new location; and
train the neural network using the data throughput or other link quality, parameter of signals received from each SSB beam of the base station at each new location.

27. The wireless device of claim 26, wherein the processor is further configured with processor-executable instructions to:
measure one or more parameters in addition to the location of the wireless device at each new location; and
train the neural network using the data throughput or other link quality parameter of signals received from each SSB beam of the base station and the measured one or more parameters at each new location.

28. A computing device, comprising:
a processor configured with processor-executable instructions to:
determine a data throughput or other link quality parameter of signals received from each of a plurality of synchronization signal block (SSB) beams of a base station at a location of the computing device;
train a neural network using the data throughput or other link quality parameter of signals received from each SSB beam of the base station at the location of the computing device; and
provide the trained neural network to a wireless device in a configuration that enables the wireless device to determine the signal quality difference threshold associated with the location of the wireless device and whether to autonomously switch monitored SSB beams of a base station.

29. The computing device of claim 28, wherein the processor is further configured with processor-executable instructions to repeatedly move the computing device to a new location, determine a data throughput or other link quality parameter of signals received from each SSB beam of the base station at each new location, and train the neural network using the data throughput or other link quality parameter of signals received from each SSB beam of the base station at each new location.

30. The computing device of claim 28, wherein the processor is further configured with processor-executable instructions to:
measure one or more parameters in addition to the location of the wireless device at each new location; and
train the neural network using the data throughput or other link quality parameter of signals received from each SSB beam of the base station and the measured one or more parameters at each new location.

* * * * *